(12) United States Patent
Cornelius

(10) Patent No.: US 7,477,704 B1
(45) Date of Patent: Jan. 13, 2009

(54) DIGITAL SIGNAL DETECTION FOR HIGH SPEED SIGNALING SYSTEMS

(75) Inventor: William Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 862 days.

(21) Appl. No.: 10/417,963

(22) Filed: Apr. 16, 2003

(51) Int. Cl.
*H03K 9/00* (2006.01)

(52) U.S. Cl. .................... 375/316; 327/52; 327/89; 327/96; 327/127; 327/246; 327/266; 327/274; 327/280; 327/287; 327/359; 327/563; 330/252; 375/318; 388/910

(58) Field of Classification Search ............... 375/232, 375/249; 318/627; 320/131; 363/124; 330/2; 385/24; 710/107; 398/212; 327/108, 336
See application file for complete search history.

(56) References Cited

U.S. PATENT DOCUMENTS

| | | | | |
|---|---|---|---|---|
| 3,273,060 A | * | 9/1966 | Schneider | 324/131 |
| 3,665,282 A | * | 5/1972 | Skehan | 318/627 |
| 3,925,731 A | * | 12/1975 | Brainard et al. | 375/249 |
| 3,953,783 A | * | 4/1976 | Peters, Jr. | 363/124 |
| 4,481,625 A | | 11/1984 | Roberts et al. | |
| 4,528,676 A | * | 7/1985 | Mein et al. | 375/232 |
| 5,097,157 A | * | 3/1992 | Jaffe et al. | 327/55 |
| 5,172,016 A | | 12/1992 | Dobberpuhl | |
| 5,424,677 A | * | 6/1995 | Carson | 330/2 |
| 5,486,777 A | | 1/1996 | Nguyen | |
| 5,493,657 A | | 2/1996 | Van Brunt et al. | |
| 5,537,498 A | * | 7/1996 | Bausman et al. | 385/24 |
| 5,606,268 A | | 2/1997 | Van Brunt | |
| 5,959,492 A | | 9/1999 | Khoury et al. | |
| 6,111,437 A | | 8/2000 | Patel | |
| 6,151,648 A | * | 11/2000 | Haq | 710/107 |
| 6,175,438 B1 | * | 1/2001 | Agarwal et al. | 398/212 |
| 6,288,581 B1 | * | 9/2001 | Wong | 327/108 |
| 6,661,355 B2 | | 12/2003 | Cornelius | |
| 6,734,811 B1 | | 5/2004 | Cornelius | |
| 6,879,181 B2 | | 4/2005 | Cornelius | |

OTHER PUBLICATIONS

Analog Devices, Inc.: "Low Distortion 1.0 GHz Differential Amplifier—AD8350", 2001.
Phillip E. Allen; Douglas R. Holberg: "CMOS Analog Circuit Design", Oxford University Press, 1987, pp. 278 & 388.

* cited by examiner

*Primary Examiner*—David C Payne
*Assistant Examiner*—Adolf Dsouza
(74) *Attorney, Agent, or Firm*—Blakely, Sokoloff, Taylor & Zafman LLP

(57) ABSTRACT

Methods and apparatuses for detecting digital signals in high speed signaling systems. In at least one embodiment, at least one received input signal is combined with a plurality of predetermined reference signals according to a plurality of prior digital signal output states to generate a signal for detecting a present digital signal output state. In one aspect of the invention, a method for determining a digital signal state in a differential signaling system includes: comparing a first differential input signal to a second differential input signal; determining a prior digital signal output state; comparing the first differential input signal to one of a first reference voltage and a second reference voltage; comparing the second differential input signal to one of the first reference voltage and the second reference voltage; and determining a present digital signal output state from the prior digital signal output state and from all of the comparisons.

113 Claims, 21 Drawing Sheets

DIGITAL SIGNAL DETECTION FOR HIGH SPEED SIGNALING SYSTEMS

FIELD OF THE INVENTION

The invention relates to computer signal communication, more particularly to digital signal detection in high speed signaling systems.

BACKGROUND OF THE INVENTION

There have been increasing demands for high speed data communication links between computers and between components of computers. Wirelines are typically used in high speed communication links, such as buses which are widely used to electronically connect electronic devices. High speed buses are utilized within a digital processor system to connect various components of the system, such as connecting memory to a CPU or other processing units.

For high speed data communication, a "differential" type of signal communication system has been found to be particularly advantageous. A pair of differential signals is transmitted over a pair of wires. Each wire transmits the same signal, but with different polarities. Differential signals provide higher signal to noise ratios, and better overall performance in part because signal distortions are minimized. For example, IEEE 1394 Standard specifies a high speed serial bus that transmits and receives differential signals over point-to-point links. Twisted pair or twin-x shielded cables for differential signals have been used for wiring high speed networks.

FIG. 2 illustrates a typical differential signaling system. Data transmitting device 201 contains differential signal driver 203. The signal driver converts input digital symbols on line 205 into differential signals on a pair of wires 221. Data receiving device 211 contains differential signal receiver 213, which determines the digital signal output states (the digital symbols transmitted through the communication lines) from the differential signals received from input lines 217 and 219. Differential receiver 213 outputs the digital signal output states, which correspond to the input digital symbols (205), on line 215 for further processing by data receiving device 211.

FIG. 3 shows typical differential signals used by a typical differential receiver. Voltages $V_H$ (303) and $V_L$ (301) represent the high and low voltage rails (e.g., the extreme voltages received at the differential receiver after a number of consecutive 1's have been transmitted) at the differential receiver. Signals $S_+$ (311) and $S_-$ (313) correspond to the signals on input lines 217 and 219. It is seen that signals $S_+$ and $S_-$ contain essentially the same signal, but with different polarities. When the digital signal output state is 1, signal $S_+$ is higher than signal $S_-$; when the digital signal output state is 0, signal $S_+$ is lower than signal $S_-$. Thus, a typical differential receiver compares the signal levels of $S_+$ and $S_-$ periodically to determine the digital signal output states (the digital symbols being transmitted).

When the digital symbol being transmitted changes from 1 to 0 and then back to 1, for example from time $t_0$ to $t_1$ and then to $t_2$ in FIG. 3, the voltage swing of $S_+$ is v (309). Similarly, signal $S_-$ reaches maximum swing at time $t_1$. From time $t_0$ to $t_2$, signals $S_+$ and $S_-$ cross each other to form data eye 315. Data eye 315 must be sufficiently large for a typical differential receiver to reliably determine the digital signal output state from comparing the signal levels of $S_+$ and $S_-$ at time $t_1$. A data eye is characterized by width $\delta_t$(305) and height $\delta_v$(307).

FIG. 3 shows that different signal transmission states, which indicate the characteristics of the differential signals on the transmission lines, may be associated with different sequences of transmitted digital symbols. For example, the signal transmission state at time to is associated with a changing sequence of digital symbols and a smaller data eye; and the signal transmission state at time $t_2$ is associated with a larger data eye. A traditional differential signal receiver has a higher probability in correctly detecting a transmitted digital symbol for some signal transmission states while having a smaller probability in correctly detecting a transmitted digital symbol for some other signal transmission states. The performance of the transmission line is limited by the smaller probability associated with the signal transmission states with smaller data eyes.

Typically, a signal driver (e.g., driver 203 in FIG. 2) is designed to force rapid changes in the differential signals when the transmitted digital symbols are changed. A rapid change enables a differential signal to swing from one rail to another quickly in order to form a large data eye. However, a rapid change in the differential signal contains high frequency Fourier components. Whether or not such high frequency Fourier components can be reliably transmitted may be severely restricted by the signal transmission system when the data transfer rate is high. Both skin effect and dielectric loss cause frequency dependent attenuation. As the frequency increases the attenuation increases. Skin effect limits the current for high frequency signals to the near surface region of a transmission wire, which leads to a significant increase in the resistance of the wire, resulting in high signal attenuation. Further, dielectric loss of the printed circuit broad may further attenuate the high frequency components of the signal. Furthermore, noise (e.g., intersymbol interference, crosstalk, reflections due to connectors or printed circuit board vias, and others) degrades a communication link in a way that is proportional to the frequencies of the Fourier components.

SUMMARY OF THE DISCLOSURE

Methods and apparatuses for detecting digital signals in high speed signaling systems are described here. Some embodiments of the present invention are summarized in this section.

In at least one embodiment of the present invention, at least one received input signal is combined with a plurality of predetermined reference signals according to a plurality of prior digital signal output states to generate a signal for detecting a present digital signal output state.

In one embodiment of the invention, a method for determining a digital signal state (e.g., a transmitted digital symbol) in a differential signaling system includes: comparing a first differential input signal to a second differential input signal; determining a prior digital signal output state; comparing the first differential input signal to one of a first reference voltage and a second reference voltage; comparing the second differential input signal to one of the first reference voltage and the second reference voltage; and determining a present digital signal output state from determining the prior digital signal output state and from all of the comparisons. In one example according to this aspect, the prior digital signal output state determines which one of the reference voltages is compared to the first differential input signal. Information about the previous signal transmission state of the differential signals (e.g., signal levels of the differential signals for transmitting the previous digital symbol) is determined from a plurality of prior digital signal output states. The information about the previous signal transmission state determines how the results of the comparisons are weighted in determining the present digital signal output state.

In another embodiment of the invention, a method to determine a digital signal state in a differential signaling system includes: determining information about a present signal transmission state from a plurality of prior digital signal output states; performing a plurality of comparisons using a first differential input signal, a second differential input signal and at least one reference signal; and determining a present digital signal output state from the information about the present signal transmission state and results of the plurality of comparisons. The information about the present signal transmission state indicates possible transmitted signal levels for the present signal transmission state. In one example according to this aspect, two prior digital signal output states are compared to each other to determine the information about the present signal transmission state. Information about a prior signal transmission state is stored for the determination of the information about the present signal transmission state. Reference signals have predetermined signal levels. In another example according to this aspect, the results of the plurality of comparisons are combined into intermediate results; and one of the intermediate results is selected as the present digital signal output state. The results of the plurality of comparisons are weighted according to the information about the present signal transmission state in determining the present digital signal output state.

In another embodiment of the invention, a method to determine a digital signal state in a high speed signaling system includes: determining a previous signal transmission state from a plurality of prior digital signal output states; determining a comparison between two signals according to the previous signal transmission state; and determining a present digital signal output state from the comparison. The two signals are two combinations of at least one received input signal and at least one reference signal; and at least one of the two combinations includes one reference signal. In one example, each of the two combinations includes one of the at least one reference signal. In one example, one of the two combinations is obtained from at least one differential amplifier; in another example, one of the two combinations is obtained from an impedance network. The impedance network comprises an adjustable resistor controlled according to the previous signal transmission state. The previous transmission state and the plurality of prior digital signal output states control the adjustable resistor. In one example, the adjustable resistor includes a plurality of resistors connected together through a plurality of gates. In one example, at least one adjustable resistor is adjusted according to the plurality of prior digital signal output states to control an impedance of the signal receiver. In one example, the at least one received input signal comprises a pair of differential signals; and, the speed of the differential signals is above 500 MHz. In one example, at least one received input signal further includes a signal from a neighboring signal line; the signal from the neighboring signal line is combined into at least one of the two combinations to reduce effect of crosstalk from the neighboring signal line; and, at least one adjustable resistor is used to combine the signal from the neighboring signal line into the at least one of the two combinations. In one example, the at least one adjustable resistor is adjusted to optimize the reduction of crosstalk effect from the neighboring signal line. In one example, the two combinations are determined from the previous signal transmission state and the plurality of prior digital signal output states. In one example according to this aspect, the comparison is selected from a plurality of comparisons, according to the previous signal transmission state and the plurality of prior digital signal output states. The previous signal transmission state is determined from the plurality of prior digital signal output states and from a signal transmission state prior to the previous signal transmission state.

In one embodiment of the present invention, a method to reduce crosstalk effect at a signal receiver includes: generating a first combined signal which includes a combination of at least a first differential input signal and a signal from a neighboring signal line; generating a second combined signal which includes a second differential input signal; and comparing the first and second combined signals to determine a present digital signal output state. In one example, the second combined signal also includes the signal from the neighboring signal line. In one example, the first and second combined signals include at least one predetermined reference signal. In one example, the first and second combined signals are generated according to a plurality of prior digital signal output states (e.g., determining a previous signal transmission state from the plurality of prior digital signal output states; and generating the first and second combined signals according to the previous signal transmission state).

In some embodiments of the present invention, the results of the comparisons are substantially linear with respect to the differences between the corresponding signals being compared; in some other embodiments of the present invention, the results of the comparisons can be nonlinear with respect to the differences between the corresponding signals being compared.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
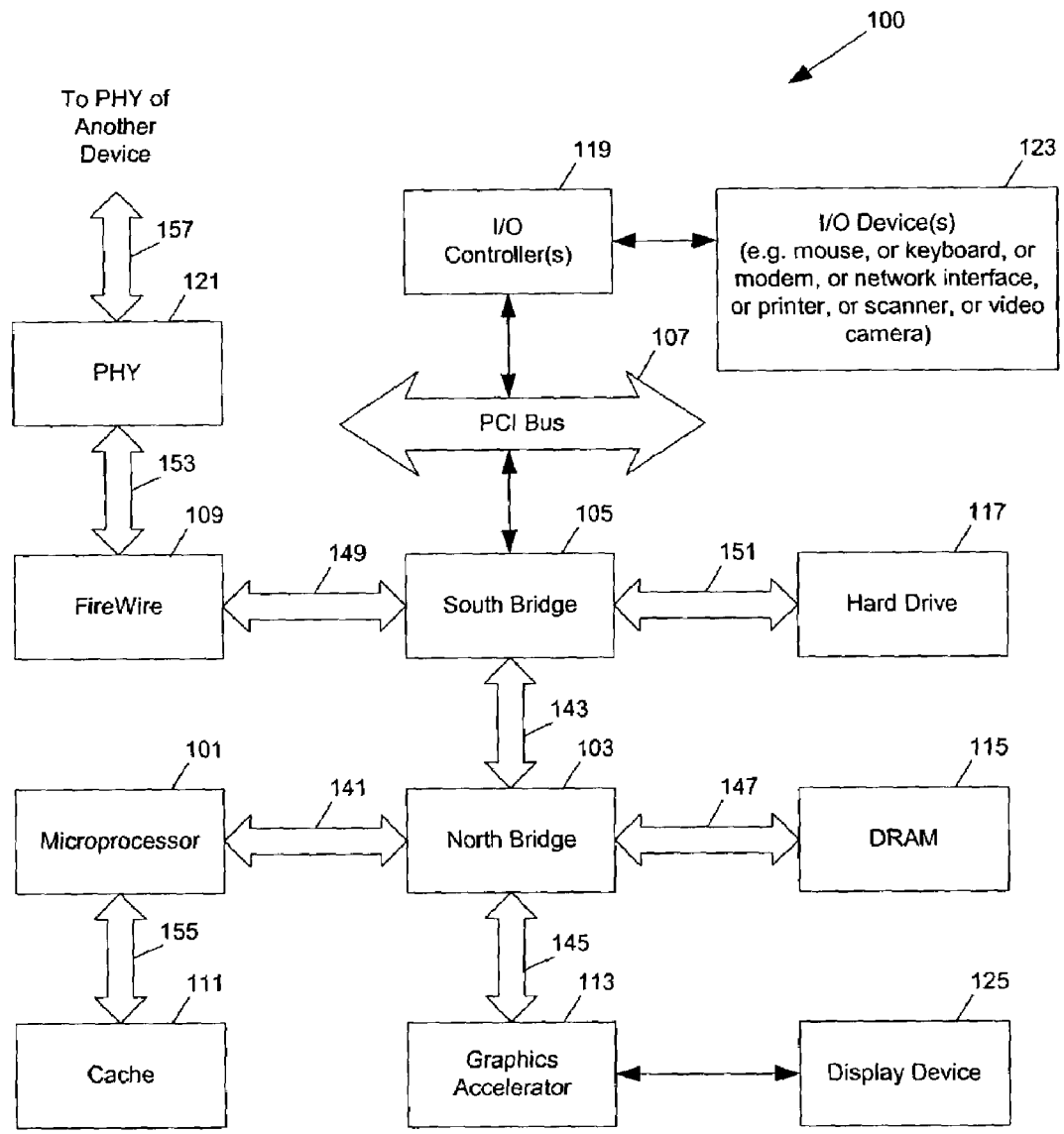
FIG. 1 shows a block diagram example of a data processing system in which signal receivers according to various embodiments of the present invention may be used.
Figure 2:
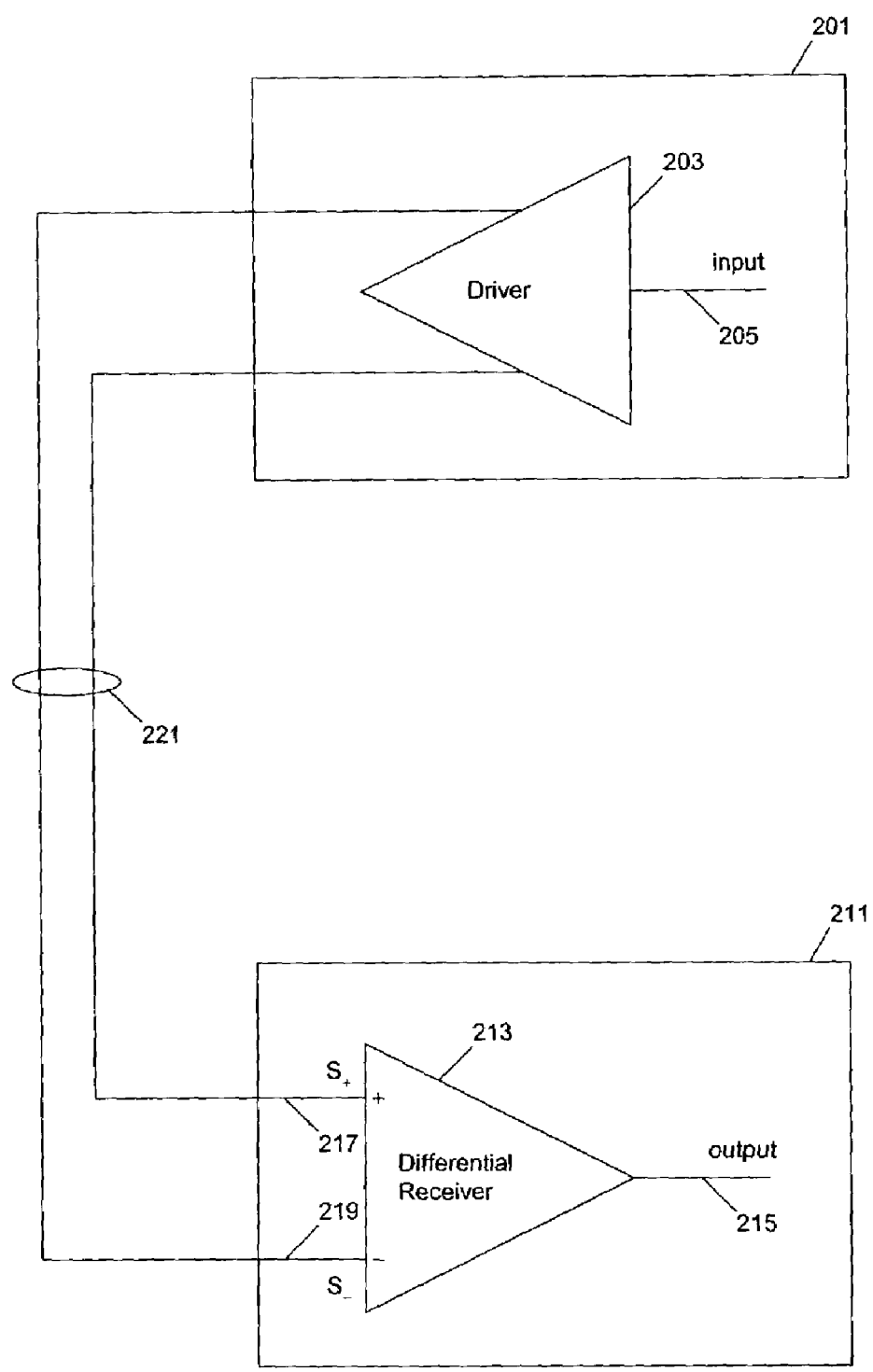
FIG. 2 illustrates a typical differential signaling system.

FIG. 1 shows a block diagram example of a data processing system in which signal receivers according to various embodiments of the present invention may be used. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also use signal receivers according to the present invention. The computer system of FIG. 1 may, for example, be an Apple Macintosh computer.

As shown in FIG. 1, the computer system 100, which is a form of a data processing system, includes microprocessor 101, north bridge 103, south bridge 105, memory devices (e.g., cache 111, DRAM 115, hard drive 117), and other components. The microprocessor 101 is coupled to cache memory as shown in the example of FIG. 1. North bridge 103 connects DRAM (Dynamic Random Access Memory) 115 (or, other types of RAM) to microprocessor 101. Similarly, north bridge 103 further connects graphics accelerator 113 and south bridge 105 with communication links 145 and 143. Display device 125 is coupled to graphics accelerator 113; and, various components (e.g., I/O devices 123, such as mice, keyboards, modems, network interfaces, printers, scanners, video cameras and other devices which are well known in the art) are coupled to the south bridge through I/O controller 119 and PCI Bus 107. South bridge 105 can have high speed communication links (e.g., 149 and 151) to communicate with other devices (e.g., FireWire controller 109 (IEEE-1394 bus adapter), hard drive 117, or other peripheral devices). Further, receivers according to embodiments of the present invention can be used in the communication link 153 for connecting the FireWire controller 153 and PHY 153 (Physical Link Layer Device) and in the FireWire cable connection 157. While FIG. 1 shows that hard drive 117 is a local device directly coupled to south bridge 151, it will be appreciated that hard drive 117 may be connected (e.g., from a remote system) to south bridge 153 through FireWire 109 (or through a network interface, such as a modem or Ethernet interface). In one embodiment south bridge 105 is further connected to a USB (Universal Serial Bus) adapter for controlling USB peripherals.

At least one embodiment of the present invention seeks to utilize previously determined digital signal output states in determining the present digital signal output state, which is the digital symbol represented by the present differential signals.

Figure 3:
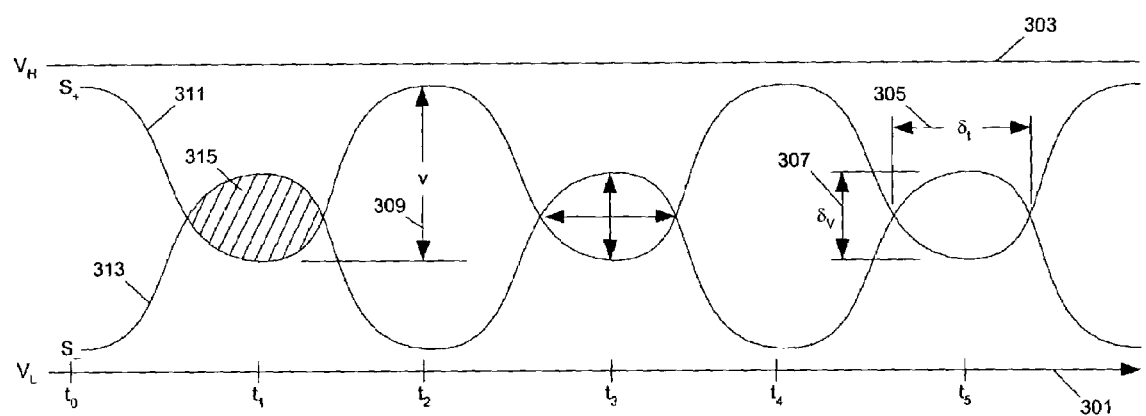
FIG. 3 shows typical differential signals used by a typical differential receiver.

In a traditional differential receiver, the differential signals are compared to each other for all different types of signal transmission states. For example, in FIG. 3, differential signals are compared to each other at times $t_1$ and $t_2$ in determining the corresponding digital signal output states (digital symbols being transmitted). However, the data eye is smaller at time $t_1$ where the differential signals are in a transition state; and the data eye is larger at time $t_2$ where the differential signals are in a full rail state, in which the differential signals approach the extreme voltages that can be reached after consecutively transmitting a number of same digital symbols (e.g., a number of 1's). It is understood that at a full rail state, the differential signals may not have exactly settled at the extreme voltages. Signal noise and data rate may affect the timing of reaching the extreme voltages. Thus, the traditional system has a lower probability in correctly detecting the digital symbol in a case where the differential signals are in a transition state. Since the worst-case scenario limits the performance and the speed of the communication line, it is desirable to increase the probability for correctly detecting a digital symbol in worst cases. In some embodiments of the present invention, the differential signals and predetermined reference signals are combined and/or weighted according to the previously determined digital signal output states in determining the present digital signal output state in order to balance the probability for correctly detecting the digital signal output states for all cases.

Figure 4:
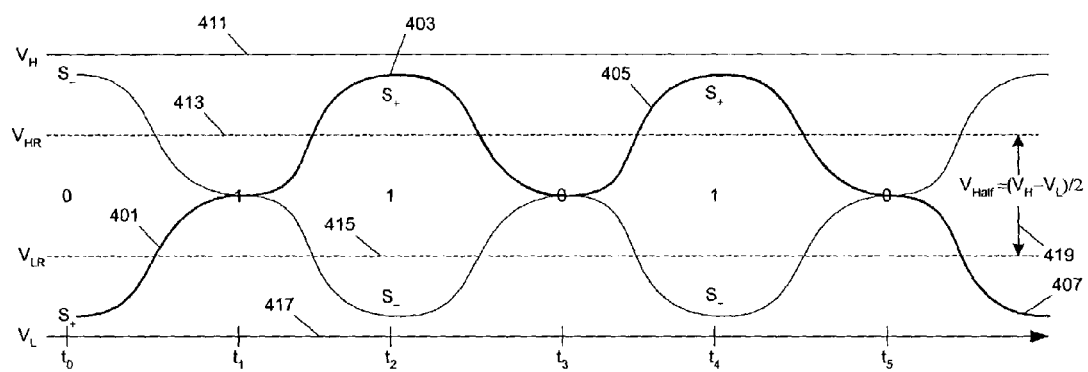
FIG. 4 illustrates differential signals that can be used with a differential signal receiver according to one embodiment of the present invention.

FIG. 4 illustrates differential signals that can be used with a differential signal receiver according to one embodiment of the present invention. A pair of complementary differential signals $S_+$ and $S_-$ is used to transmit digital symbols. At time $t_0$, the digital symbol being transmitted is 0; $S_+$ is close to lower voltage rail $V_L$ (417); and $S_-$ is close to higher voltage rail $V_H$ (411). At time $t_1$, $S_+$ (401) and $S_-$ approach to each other in a transition phase to transmit a digital symbol of 1. At time $t_2$, differential signal $S_+$ (403) reaches full rail to represent 1. At time $t_3$, the differential signals are in transition to represent 0. From $t_3$ to $t_4$, $S_+$ increases (405), while $S_-$ decreases, to represent 1. While data eyes are large at times $t_0$, $t_2$ and $t_4$, no data eye exists at times $t_1$ and $t_3$. Thus, a traditional differential receiver cannot use such differential signals to transmit data.

However, previously determined digital signal output states can be used to determine information about the present signal transmission state. For example, such information about the present signal transmission state can be the possible range of voltage change from the previous voltage levels of the differential signals for transmitting the previous digital symbol. When the information about the present signal transmission state (or the previous signal transmission state) is known, the differential signals can be compared to (or combined with) a number of reference voltages, such as $V_L$, $V_H$, $V_{LR}$ (415), $V_{HR}$ (413) or $V_{Half}$ (419), to determine the present digital signal output state. $V_{Half}$ represents a half rail (or near a half rail) voltage change; $V_{LR}$ and $V_{HR}$ are a quarter rail (or near a quarter rail) away from $V_L$ and $V_H$ respectively. The received differential signals may be combined and/or weighted with these reference signals, according to the previous received digital symbols, to provide suitable signals for detecting the presently transmitted digital symbol. For example, after the differential signals reach a state of "full rail" at time $t_2$, the subsequent digital output signal state at time $t_3$ can be determined from comparing the differential signals to the reference signals $V_{LR}$ and $V_{HR}$, or comparing two combinations of the differential signals and the reference voltages (e.g., comparing $S_+ - S_-$ and $(V_H - S_+) + (S_- - V_L)$). Whether or not there is a sufficient voltage change between the differential signals representing the present digital symbol and the differential signals representing the previous digital symbol, as indicated by the result of the comparison, may be used to determine the present digital signal output state. More detailed examples will be described below together with FIGS. 7-8.

When differential signals such as those in FIG. 4 are used, low harmonic component of changing signals may be used to signal state changes. The high frequency Fourier harmonics of the signals are not present so that the bit rate for given frequencies of Fourier components is improved for a given communication link. Faster data transmission becomes possible for a given line bandwidth.

Although FIG. 4, as well as the examples described below, illustrates a situation where a differential signal swings from one rail to another in a period for transmitting two digital symbols, it will be apparent from this description that various methods of the present invention can be applied to situations where a differential signal swings from one rail to another to transmit three or more (or less) digital symbols to facilitate even higher bit rates for given Fourier component frequencies.

Figure 17:
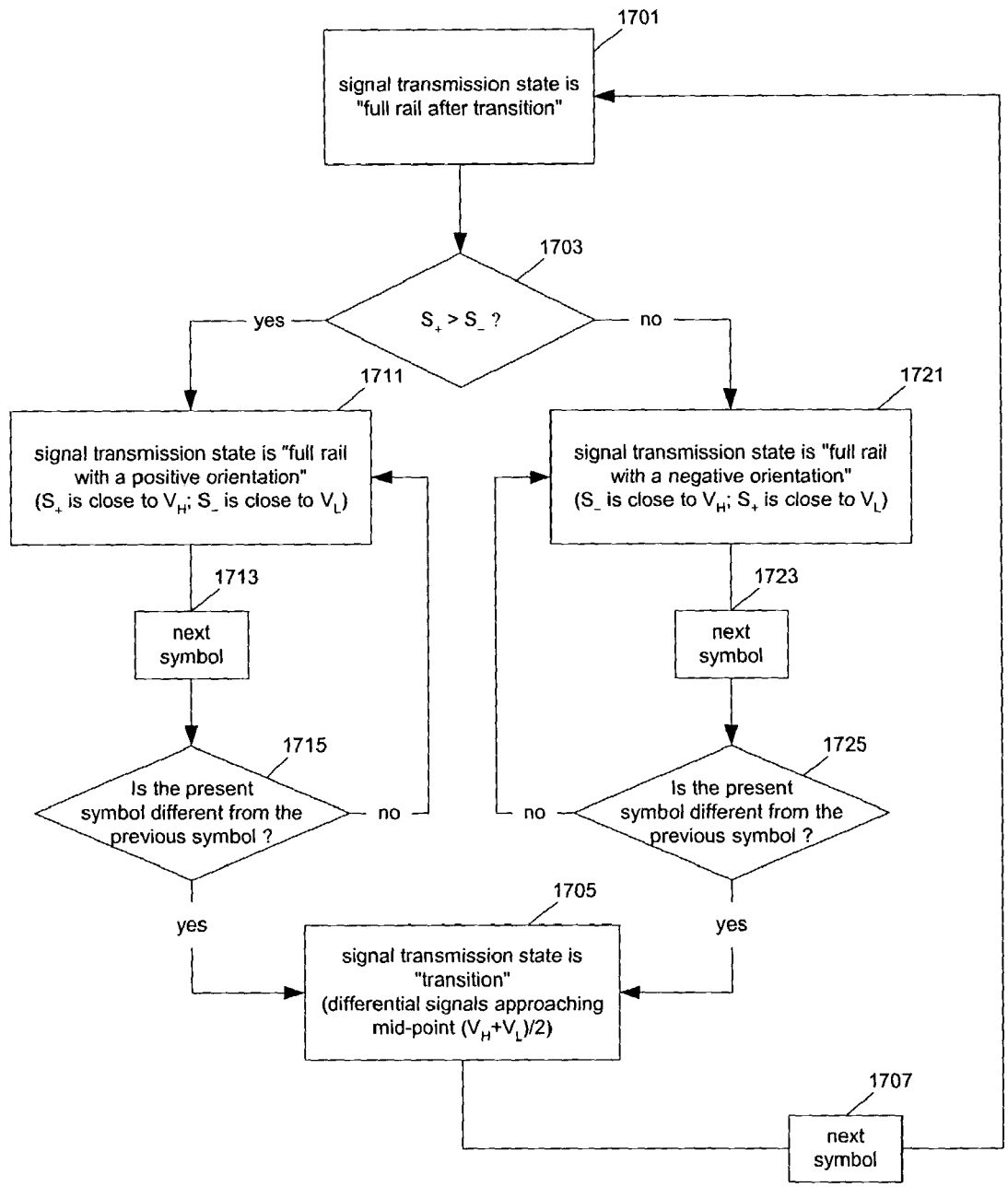
FIG. 17 shows a diagram illustrating various transition paths for signal transmission states according to one embodiment of the present invention.

FIG. 17 shows a diagram illustrating various transition paths for signal transmission states according to one embodiment of the present invention. For differential signals as shown in FIG. 4, a signal transmission state can be "full rail after transition" (1701), "full rail with a positive orientation" (1711), "full rail with a negative orientation" (1721), or "transition" (1705). It is understood that these signal transmission states are associated with the sequences of transmitted digital symbols; and thus, a previous signal transmission state can be determined from the previously received digital symbols by a receiver according to embodiments of the present invention. Further, the actual differential signal level in different systems may vary due to the different rate in which the driver drives the changes. For example, when the signal transmission state is "transition", the differential signals may form a small data eye as at time $t_1$ in FIG. 3 (or, form no data eye as at time $t_1$ in FIG. 4 or 5, or form a regular large data eye when the driver drives the change quick enough); however, a change in the transmitted digital symbols (e.g., from 1 to 0, or from 0 to 1) indicates the occurrence of such a signal transmission state of "transition". Similarly, depending on the rate the driver drives the change, the differential signals at a signal transmission state of "full rail" may not necessary reach the settled voltages. When the signal transmission state is "full rail after transition" (e.g., time $t_2$ in FIG. 4), the differential signals form a large data eye. When the signal transmission state is "full rail" and $S_+ > S_-$, as determined from operation 1703, it can be logically deduced that: i) $S_+$ is close to $V_H$; ii) $S_-$ is close to $V_L$; and iii) the signal transmission state is "full rail with a positive orientation" (1711) (e.g., time $t_2$ in FIG. 4). When the next digital symbol is transmitted (1713), operation 1715 determines whether or not the present digital symbol is different from the previous transmitted digital symbol represented by the differential signals in the state of "full rail with a positive orientation" (1711). If they are different, the signal transmission state becomes "transition" (e.g., time $t_3$ in FIG. 4); otherwise, the signal transmission state remains "full rail with a positive orientation" (1711).

Similarly, when the signal transmission state is "full rail" and $S_+ < S_-$, as determined from operation 1703, it can be determined that: i) $S_+$ is close to $V_L$; ii) $S_-$ is close to $V_H$; and iii) the signal transmission state is "full rail with a negative orientation" (1721) (e.g., time $t_0$ in FIG. 4). When the next digital symbol is transmitted (1723), operation 1725 determines whether or not the present digital symbol is different from the previous transmitted digital symbol represented by the differential signals in the state of "full rail with a negative orientation" (1721). If they are different, the signal transmission state becomes "transition" (e.g., time $t_1$ in FIG. 4); otherwise, the signal transmission state remains "full rail with a negative orientation" (1721).

When the next digital symbol is transmitted (1707) after the signal transmission state is "transition", the signal transmission state becomes "full rail after transition" (1701), regardless whether the present digital symbol is different from the previous digital symbol. For example, in FIG. 4, the signal transmission state is "transition" at times $t_1$ and $t_3$. The signal transmission state becomes "full rail after transition" at time $t_2$ after transmitting 1 at both times $t_1$ and $t_2$; and the signal transmission state becomes "full rail after transition" at time $t_4$ after transmitting 0 at $t_3$ and 1 at $t_4$. Depending on the digital symbol being transmitted, "full rail after transition" can be either "full rail with a positive orientation" or "full rail with a negative orientation".

Figure 5:
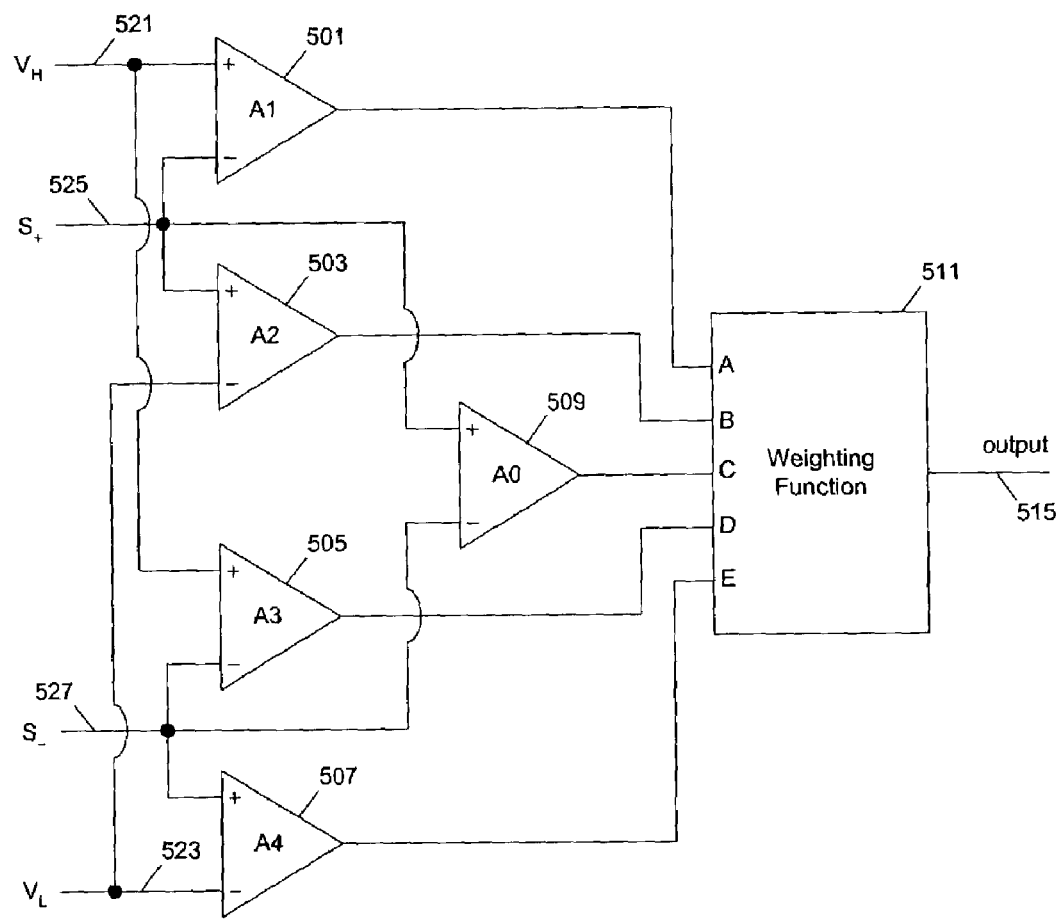
FIG. 5 illustrates a block diagram example of a differential signal receiver according to one embodiment of the present invention.

FIG. 5 illustrates a block diagram example of a differential signal receiver according to one embodiment of the present invention. Amplifiers 501-509 compare the pair of complementary differential signals with two reference voltages. Amplifier A1 (501) outputs the difference between high rail $V_H$ and differential signal $S_+$ (e.g., signal $A = V_H - S_+$); amplifier A4 (507) outputs the difference between differential signal $S_-$ and low rail $V_L$ (e.g, signal $E = S_- - V_L$); amplifier A2 (503) outputs the difference between differential signal $S_+$ and low rail $V_L$ (e.g, signal $B = S_+ - V_L$); amplifier A3 (505) outputs the difference between high rail $V_H$ and differential signal $S_-$ (e.g., signal $D = V_H - S_-$); and amplifier A0 (509) outputs the difference between differential signals $S_+$ and $S_-$ (e.g., signal $C$ $S_+ - S_-$). Weighting function 511 weights the outputs of amplifiers A0-A4 according to the prior digital signal output states to determine the present digital signal output state represented by the present received differential signals. In a typical example according to this embodiment of the present invention, amplifiers A0-A4 are differential amplifiers with analog outputs that vary continuously and smoothly in response to the input differences of the corresponding input signals.

The weight function 511 may weight, digitize and combine the output results of the amplifiers (A0-A4) to determine the present digital signal output state according to prior digital signal output signals. For example, a number of prior digital signal output signals may be used to determine the previous signal transmission state. Assume amplifiers A0-A4 produce signals $C = (S_+ - S_-)$, $A = (V_H - S_+)$, $B = (S_+ - V_L)$, $D = (V_H - S_-)$, and $E = (S_- - V_L)$ respectively. When the previous signal transmission state is "full rail with a positive orientation", whether or not $C - (A+E) = (S_+ - S_-) - [(V_H - S_+) + (S_- - V_L)] = 2 S_+ - 2 S_- - V_H + V_L$ is larger than zero can be used to determined the present digital signal output state; when the previous signal transmission state is "full rail with a negative orientation", whether or not $C - (B+D) = (S_- - S_+) - [(V_H - S_-) + (S_+ - V_L)] = 2 S_- - 2 S_+ - V_H + V_L$ is larger than zero can be used to determined the present digital signal output state; and when the previous signal transmission state is "transition", whether or not ($S_+ - S_-$) is larger than zero can be used to determined the present digital signal output state. Detailed examples are described below.

Figure 6:
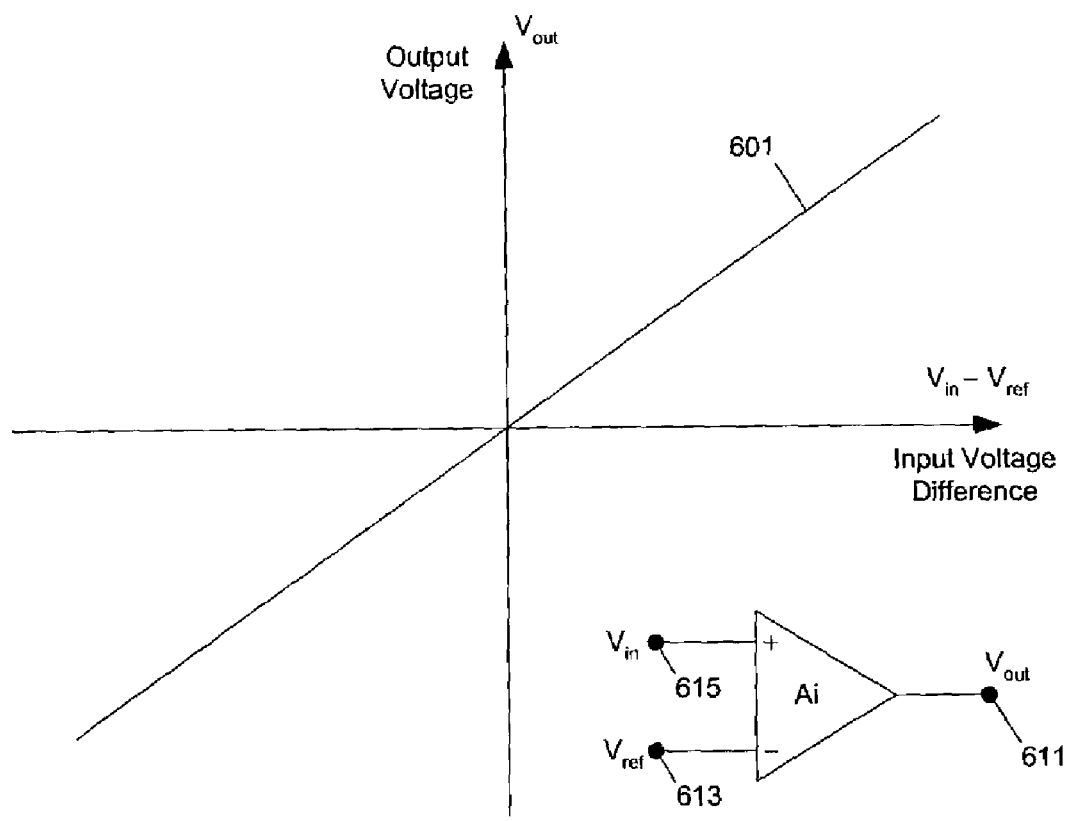
FIG. 6 shows properties of a differential amplifier which may be used in differential signal receivers according to various embodiments of the present invention.

FIG. 6 shows properties of a differential amplifier which may be used in differential signal receivers according to various embodiments of the present invention. For example, the amplifiers of such properties can be used in the places of amplifiers 501-509 in FIG. 5. In FIG. 6, the output voltage $V_{out}$ (611) (or output current $I_{out}$ in other embodiments) varies substantially linearly with respect to the difference between input voltages $V_{in}$ (615) and $V_{ref}$ (613) (or input currents $I_{in}$ and $I_{ref}$), as shown by line 601. Although an amplifier with analog output is preferred to have a substantially linear transfer function in some examples of the present invention, an amplifier with a monotonic and relative smooth but nonlinear transfer function may also be used with some embodiments of the present invention. Various amplifiers known in the art can be used. For example, a low distortion differential amplifier (e.g., AD8350 available from Analog Devices, Inc.) can be used. In some embodiments of the present invention, amplifiers that produce digital outputs are used. Such digital amplifiers (or, comparators) are typically used in conventional differential signal receivers and well known to those skilled in the art.

Although FIG. 6 and various examples of the present inventions are illustrated using voltage amplifiers (e.g., those operating on voltages $V_{in}$, $V_{ref}$, $V_{out}$, etc.), it would be apparent to one skilled in the art that current amplifiers (e.g., those operating on electrical currents $I_{in}$, $I_{ref}$, $I_{out}$, etc.) can also be used. Various operations for combining input voltages using voltage amplifiers, as illustrated in various examples in FIGS. 9-11, can also be extended to corresponding operations for combining input currents using current amplifiers.

Figure 7:
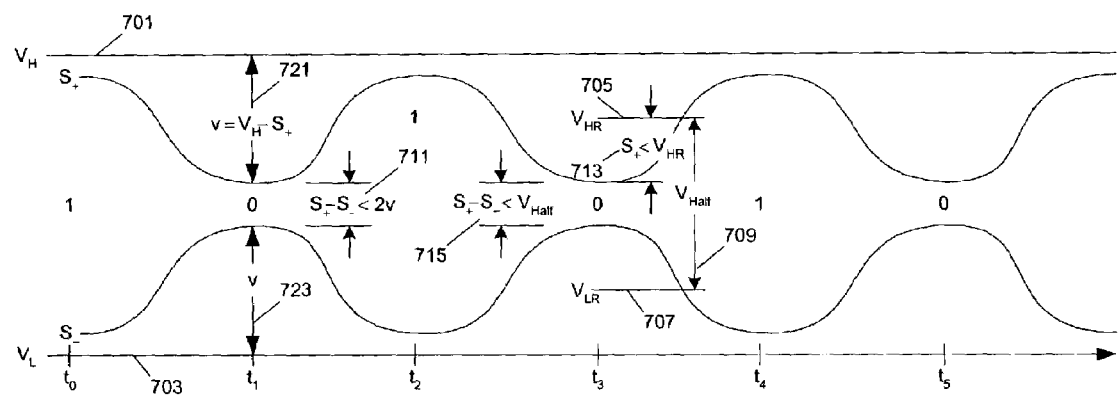
FIGS. 7-8 show various methods to determine digital signal output states according to various embodiments of the present invention.
Figure 8:
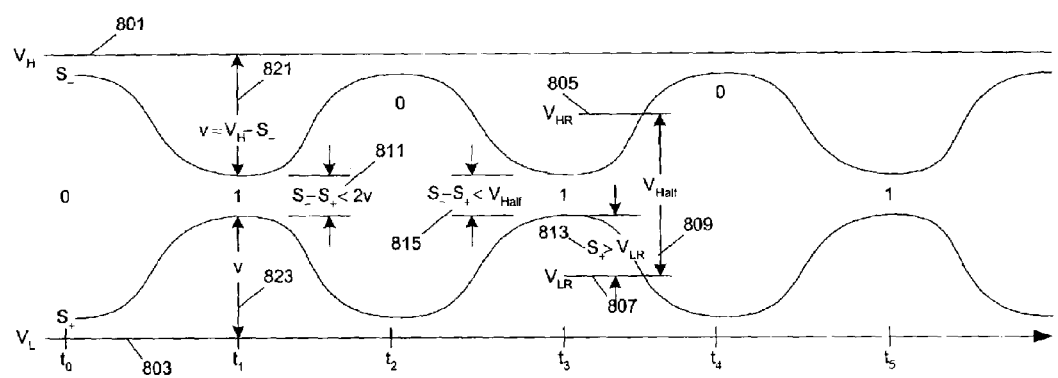

FIGS. 7-8 show various methods to determine digital signal output states according to various embodiments of the present invention.

FIG. 7 shows signal transmission states of "transition" following after "full rail with a positive orientation", where signal $S_+$ transits from a voltage close to high rail $V_H$ (701) and signal $S_-$ transits from a voltage close to low rail $V_L$ (703) (e.g., from time $t_0$ to $t_1$, $t_2$ to $t_3$, or $t_4$ to $t_5$). At time $t_0$ ($t_2$ or $t_4$), the differential signals are in a state of "full rail with a positive orientation". At time $t_1$ ($t_3$ or $t_5$), the differential signals are a state of "transition" where the signal levels are changed to represent the change in digital signal output states.

After the differential signals are in a state of "full rail with a positive orientation", it is necessary to determine if the differential signals remain in the state of "full rail with a positive orientation" to represent one. The voltage swings during the transition from $t_0$ to $t_1$ are $V_H - S_+ = v$ (721) and $S_- - V_L$ (723) for signals $S_+$ and $S_-$ respectively. In one example according to the present invention, signal difference $S_+ - S_-$ is compared to the sum of the voltage swings ($V_H - S_+$) + ($S_- - V_L$) to determine if the digital signal output state has changed from 1 at time to 0 at time $t_1$. When the signal difference is smaller than the sum of the voltage swings (711), it is asserted that the digital signal output state has changed from 1 to 0 and the signal transmission state becomes "transition" at time $t_1$; otherwise, both the digital signal output state and the signal transmission state remain unchanged from $t_0$ to $t_1$. In another example according to the present invention, the signal difference ($S_+ - S_-$) is compared to a reference voltage ($V_{Half}$). When the signal difference is smaller than the reference voltage (715), it is asserted that the digital signal output state has changed from 1 to 0 (e.g., from $t_2$ to $t_3$); otherwise, the digital signal output state remains unchanged. In a further example according to the present invention, signals $S_+$ and $S_-$ are compared to the reference voltages $V_{HR}$ (705) and $V_{LR}$ (707) respectively. When the voltage swings cause one (or both) of the differential signals passing across the reference voltages ($V_{HR}$ and $V_{LR}$), it is asserted that the digital signal output state has changed from 1 to 0; otherwise, the digital signal output state remains unchanged.

After the signal transmission state is "transition" (e.g., after time $t_1$), the signal transmission state becomes "full rail after transition" (e.g., at time $t_2$), irrespective to whether or not there is a change in the digital signal output states. Thus, after "transition", the differential signals form a large data eye (e.g., at time $t_2$ or $t_4$); and differential signals $S_+$ and $S_-$ can be compared to each other to determine the present digital signal output state. For example, in FIG. 4, after a transition at times $t_1$ or $t_3$, there is no change in digital signal output states from time $t_1$ to $t_2$; and there is a change in the digital signal output states from time $t_3$ to $t_4$. However, there are both large data eyes at times $t_2$ and $t_4$. Although comparing $S_+$ and $S_-$ is used as an example for determining the present digital signal output state when the signal transmission state becomes "full rail after transition", other comparisons using combinations of the differential signals and reference voltages can also be used to determine the present digital signal output state. For example, $S_+ - S_-$ may be compared to a reference voltage $V_S$ (e.g., a quarter rail). When $S_+ - S_- > V_S$, the digital signal output state is 1; otherwise, 0. $V_S$ can be near a quarter rail. When $V_S$ is zero, the method reduces to simply comparing differential signals $S_+$ and $S_-$.

FIG. 8 shows a situation similar to that in FIG. 7. Signal transmission states of "transition" follow after "full rail with a negative orientation". At time $t_0$ ($t_2$ or $t_4$), the differential signals are in a state of "full rail with a negative orientation". Signal $S_+$ is close to low rail $V_L$ (803); and signal $S_-$ is close to high rail $V_H$ (801) (e.g., at time $t_0$, $t_2$, or $t_4$). At time $t_1$ ($t_3$ or $t_5$), the differential signals are in a state of "transition".

After the differential signals are in a state of "full rail with a negative orientation", it is necessary to determine if the differential signals remain in the state of "full rail with a negative orientation" to represent zero. The voltage swings during the transition from $t_0$ to $t_1$ are $V_H - S_- = v$ (821) and $S_+ - V_L$ (823) for signals $S_-$ and $S_+$ respectively. In one example according to the present invention, the signal difference $S_- - S_+$ is compared with the sum of the voltage swings ($V_H - S_-$) + ($S_+ - V_L$) to determine if the digital signal output state has changed from 0 at time $t_0$ to 1 at time $t_1$. When the signal difference is smaller than the sum of the voltage swings (811), it is asserted that the digital signal output state has changed from 0 to 1 and the signal transmission state becomes "transition" at time $t_1$; otherwise, both the digital signal output state and the signal transmission state remain unchanged from to to $t_1$. In another example according to the present invention, the signal difference ($S_- - S_+$) is compared to a reference voltage ($V_{Half}$). When the signal difference is smaller than the reference voltage (815), it is asserted that the digital symbol being transmitted has changed from 0 to 1 (e.g., from $t_2$ to $t_3$); otherwise, the digital signal output state remains unchanged. In a further example according to the present invention, signals $S_+$ and $S_-$ are compared to the reference voltages $V_{LR}$ (807) and $V_{HR}$ (805) respectively. When the voltage swings cause one (or both) of the differential signals passing across the reference voltages ($V_{LR}$ and $V_{HR}$), it is asserted that the digital signal output state has changed from 0 to 1; otherwise, the digital signal output state remains unchanged.

When the situations in FIGS. 7 and 8 are compared, it is seen that the orientation of the differential signals at a full rail state determines how the subsequent differential signals are compared to the reference voltages in determining the subsequent digital signal output state. For example, $S_+$ is compared to $V_H$ (or $V_{HR}$) at time $t_1$ after being in a state of "full rail with a positive orientation" at time $t_0$ in FIG. 7, while $S_+$ is compared to $V_L$ (or $V_{LR}$) at time $t_1$ after being in a state of "full rail with a negative orientation" at time $t_0$ in FIG. 8. The orientation of the differential signals at a full rail state can be determined from the digital symbol represented by the corresponding differential signals. For example, since the digital signal output state at time $t_0$ in FIG. 7 is 1, the signal transmission state is "full rail with a positive orientation" at time $t_0$; since the digital signal output state at time $t_0$ in FIG. 8 is 0, the signal transmission state is "full rail with a negative orientation" at time $t_0$.

Figure 9:
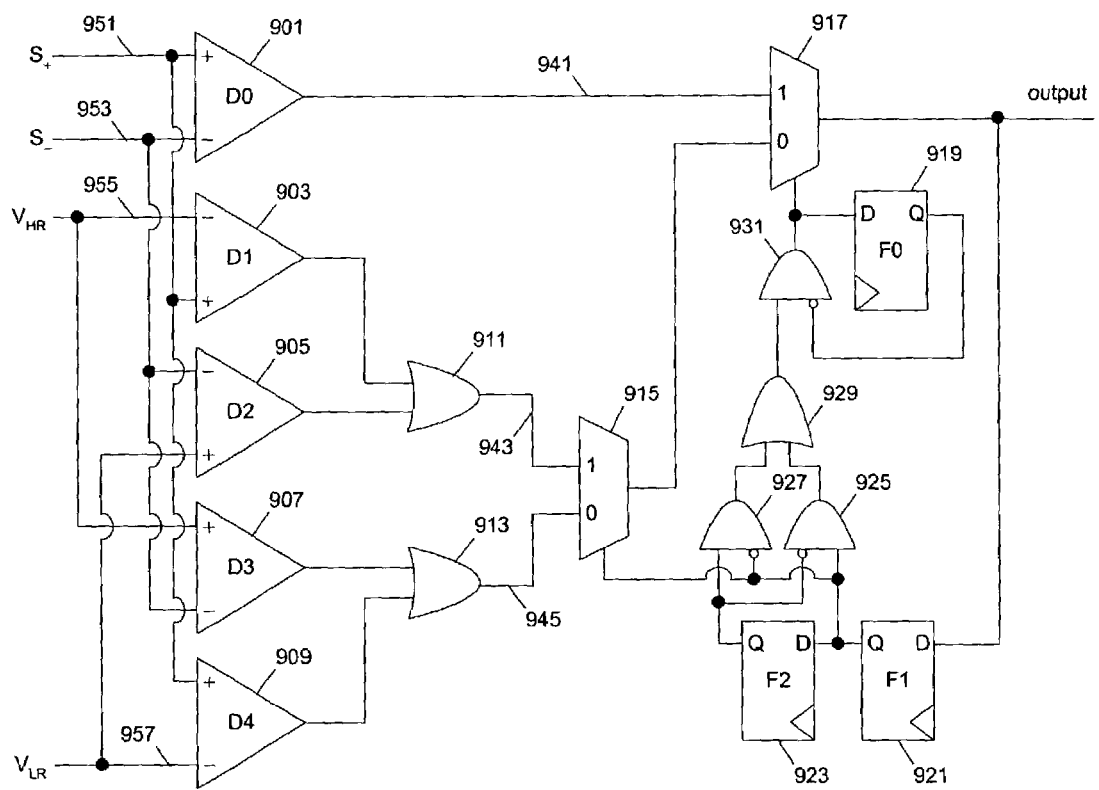
FIGS. 9-11 show schematic diagrams of differential signal receivers according to various embodiments of the present invention.
Figure 10:
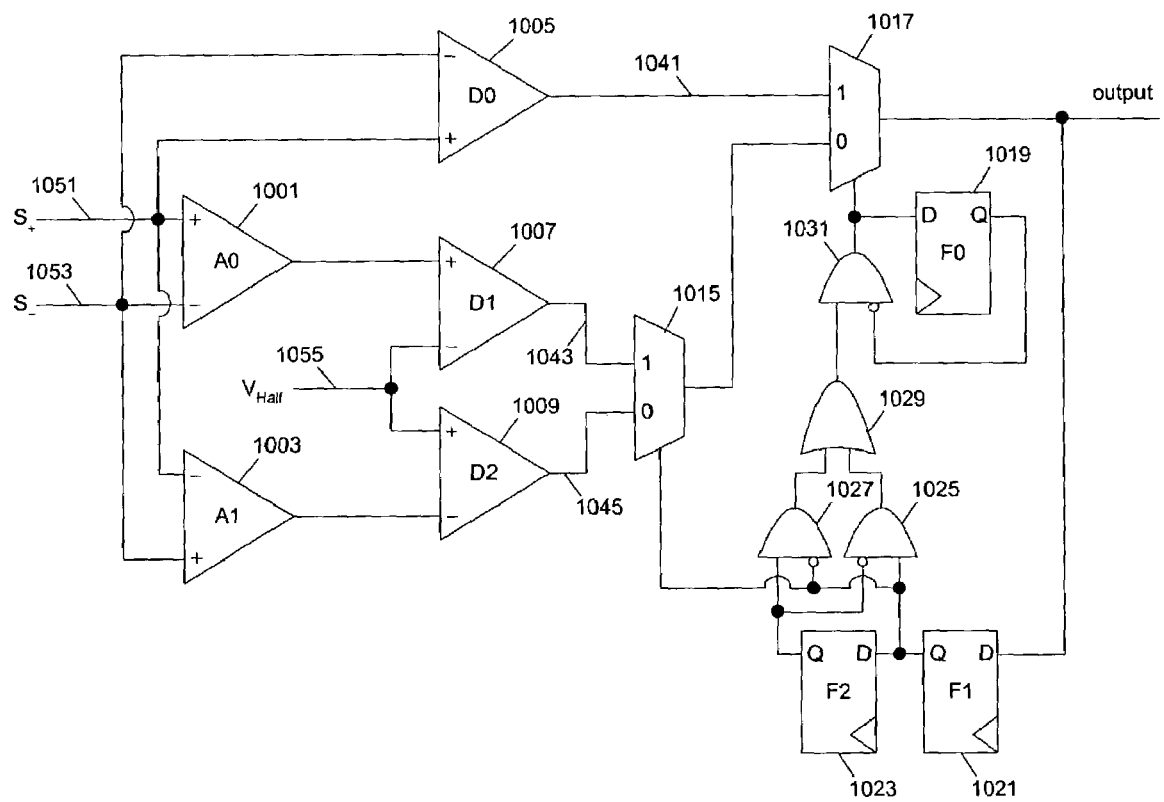
Figure 11:
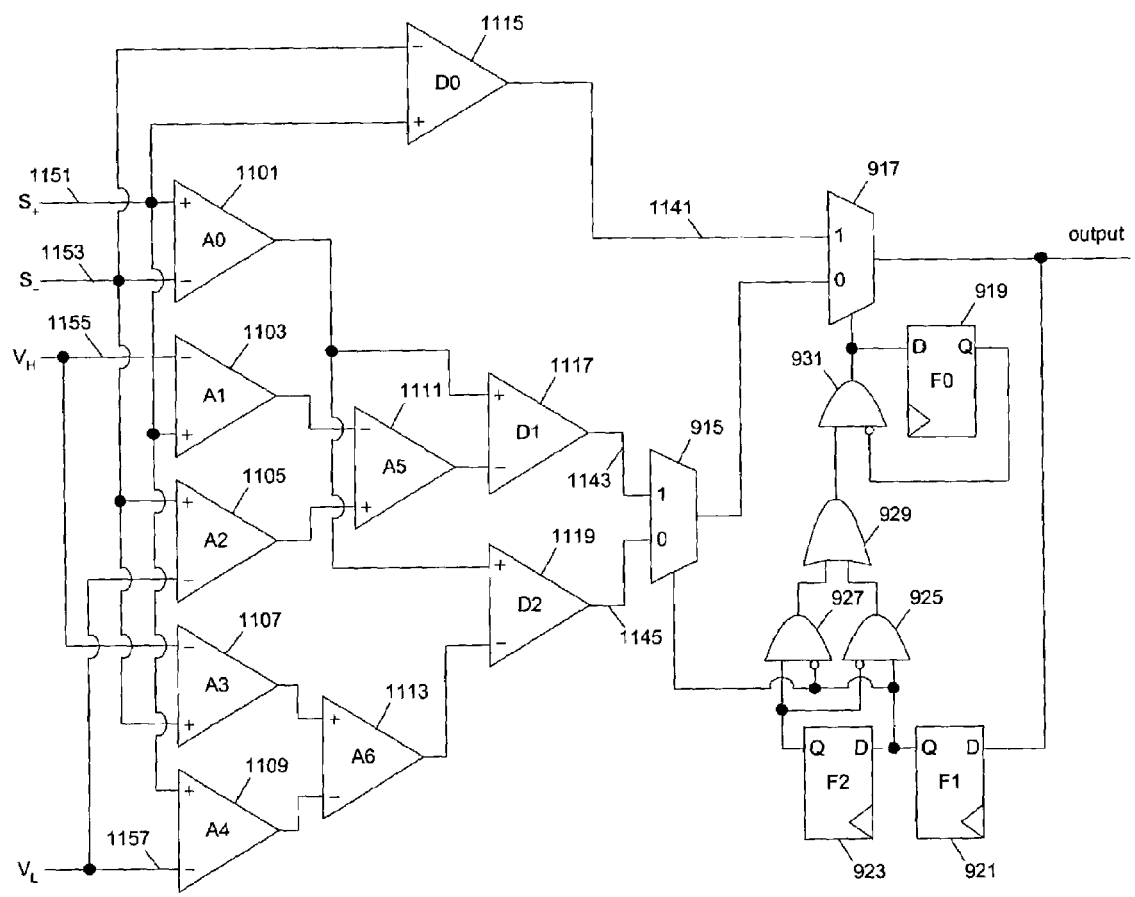

FIGS. 9-11 show schematic diagrams of differential signal receivers according to various embodiments of the present invention.

In FIG. 9, comparators 901-909 compare corresponding input signals digitally. Comparator 901 determines whether or not $S_+$ is larger than $S_-$. The result of comparator 901 (on line 941) will be selected as the digital signal output state if the present signal transmission state is "full rail after transition" (e.g., time $t_2$ or $t_4$ in FIGS. 7 and 8). From the diagram in FIG. 17, it is seen that when the previous signal transmission state is "transition", the present signal transmission state is "full rail after transition". From prior digital signal output states, logic units 919-931 determine whether or not the present signal transmission state is "full rail after transition". Comparators 903 and 905 compare the differential signals with reference voltages $V_{HR}$ and $V_{LR}$ assuming that the previous signal transmission state is "full rail with a positive orientation" (e.g., at $t_1$ in FIG. 7); and comparators 907 and 909 compare the differential signals with reference voltages $V_{HR}$ and $V_{LR}$ assuming that the previous signal transmission state is "full rail with a negative orientation" (e.g., at $t_1$ in FIG. 8). When the previous signal transmission state is "full rail with a positive orientation", the previous digital signal output state is 1; $S_+$ was close to high rail $V_H$; and $S_-$ was close to low rail $V_L$. When the previous signal transmission state is "full rail with in a negative orientation", the previous digital signal output state is 0; $S_+$ was close to low rail $V_L$; and $S_-$ was close to high rail $V_H$.

If the previous signal transmission state is "full rail with a positive orientation", logic OR unit 911 determines that the present digital signal output state is 1 when $S_+$ (951) is larger than $V_{HR}$ (955) or $S_-$ (953) is smaller than $V_{LR}$ (957); otherwise, the digital signal output state is 0. Alternative, a logic AND unit can be used in the place of logic OR unit 911 such that the present digital signal output state is 1 when $S_+$ (951) is larger than $V_{HR}$ (955) and $S_-$ (953) is smaller than $V_{LR}$ (957).

Similarly, if the previous signal transmission state is "full rail with a negative orientation", logic OR unit 913 determines that the present digital signal output state is 1 when $S_+$ (951) is larger than $V_{LR}$ (957) or $S_-$ (953) is smaller than $V_{HR}$ (955); otherwise, the digital signal output state is 0. Alternative, a logic AND unit can be used in the place of logic OR unit 913 such that the present digital signal output state is 1 when $S_+$ (951) is larger than $V_{LR}$ (957) and $S_-$ (953) is smaller than $V_{HR}$ (955).

Flip-flops F1 (921) and F2 (923) store the prior digital signal output states that have been previously determined. The immediate prior digital signal output state is stored in flip-flop F1 to control multiplexer 915, which determines whether the previous signal transmission state is "full rail with a positive orientation" or "full rail with a negative orientation", if the previous signal transmission state is "full rail". When the immediate prior digital signal output state is 1, multiplexer 915 selects the result from line 943; otherwise, the result from line 945 is selected. The exclusive OR gate formed by the logic units 925, 927 and 929 determines whether or not the previous two digital signal output states are the same. Logic unit 931 and flip-flop F0 (919) determine whether or not the present state is "full rail after a transition" (e.g., at times $t_2$ or $t_4$ in FIGS. 7 and 8). Flip-flop F0 stores the information about whether or not the previous signal transmission state is "full rail after transition". When the previous signal transmission state is not "full rail after transition", flip-flop F0 outputs 0; and logic unit 931 outputs 1 to indicate that the present signal transmission state is "full rail after transition" when the prior two digital signal output states are different. When the previous signal transmission state is "full rail after transition", the output of flip-flop F0 causes logic unit 931 to output 0, which indicates that the present signal transmission state is not "full rail after transition", regardless of the output of the exclusive OR gate. Note that when the previous signal transmission state is "full rail", the present signal transmission state cannot be "full rail after transition"; however, the present signal transmission state can be either "transition" or "full rail after full rail" ("full rail with a positive orientation" or "full rail with a negative orientation"). Initially, flip-flop 919 is initialized to output 0; and flip-flops 921 and 923 may be initialized to have different states such that the result from comparator D0 is used initially.

Alternatively, a change in digital signal out state can be determined from the present digital signal output state (the output of multiplexer 917) and the immediate prior digital signal output state (the output of flip-flop 921). Such a result can be stored for later used as an input to logic unit 931. In this case, only one immediate prior digital signal output state is stored.

In FIG. 10, amplifiers 1001 and 1003 output analog results. When amplifiers 1001 and 1003 have a linear transfer function as illustrated in FIG. 6, amplifier A0 (1001) outputs $S_+-S_-$; and amplifier A1 (1003) outputs $S_--S_+$.

Comparators D0, D1 and D2 (1005, 1007 and 1009) compare the corresponding input signals digitally. Similar to comparator 901 in FIG. 9, comparator D0 (1005) is used to determine the digital signal output state if the previous signal transmission state is "transition". When the previous signal transmission state is "full rail with a positive orientation", comparator D1 (1007) outputs 1 when the signal difference $S_+-S_-$ is larger than $V_{Half}$; and 0 when otherwise. When the previous signal transmission state is "full rail with a negative orientation", comparator D2 (1009) outputs 1 when the signal difference $S_--S_+$ is smaller than $V_{Half}$; and 0 when otherwise.

In one embodiment of the present invention, the reference signal on line 1055 is produced by an amplifier having the same transfer function f as those of A0 and A1. For example, the reference signal on line 1055 is the output of an amplifier with corresponding input voltages $V_{Half}$ and 0. Thus, the outputs of A0 and A1 are $f(S_+-S_-)$ and $f(S_--S_+)$; and the signal on line 1055 is $f(V_{Half})$. In this case, even if amplifiers A0 and A1 are not linear differential amplifiers, comparators D1 and D2 can still produce correct results as long as the transfer function f is substantially monotonic for an input difference range near $V_{Half}$. Further, A0 and A1 are required to output only positive voltages.

In FIG. 10, multiplexers 1015 and 1017 select (weight with a weight of one or zero) the results on lines 1041-1045 in a similar way as those in FIG. 9. Flip-flops F1 (1021) and F2

(1023) store the prior digital signal output states that have been previously transmitted. The immediate prior digital signal output state is stored in flip-flop F1. When the previous digital signal output state is 1, multiplexer 1015 selects the result from the comparison from line 1043; otherwise, the result from line 1045 is selected. The exclusive OR gate formed by the logic units 1025, 1027 and 1029 determines whether or not the previous two digital signal output states are the same. Logic unit 1031 and flip-flop F0 (1019) determine whether or not the previous signal transmission state is "transition" (e.g., at times $t_1$ or $t_3$ in FIGS. 7 and 8). Flip-flop F0 stores the information about whether or not the signal transmission state immediately before the previous one is "transition". When the signal transmission state immediately before the previous one is not "transition", flip-flop F0 outputs 0; and logic unit 1031 outputs 1 to indicate that the previous signal transmissions state is "transition" when the prior two digital signal output states are different. When the signal transmission state immediately before the previous one is "transition", the output of the flip-flop causes logic unit 1031 to output 0, which indicates that the previous signal transmissions state is not "transition" regardless of the output of the exclusive OR gate, since the previous signal transmission state is "full rail after transition state" (as illustrated in FIG. 17). Initially, flip-flop 1019 is initialized to output 0; and flip-flops 1021 and 1023 may be initialized to have different states such that the result from comparator D0 is used initially.

In FIG. 11, amplifiers A0-A6 (1101-1113) output analog results. When amplifiers A0-A6 have a linear transfer function as illustrated in FIG. 6, amplifier A0 (1101) outputs $S_+-S_-$; amplifier A1 (1103) outputs $S_+-V_H$; A2 (1105) outputs $S_--V_L$; A3 (1107) outputs $S_--V_H$; A4 (1109) outputs $S_+-V_L$; A5 (1111) outputs $(S_--V_L)-(S_+-V_H)$; and A6 (1113) outputs $(S_--V_H)-(S_+-V_L)$.

Comparators D0-D2 (1115-1119) compare corresponding input signals digitally. Similar to comparator 901 in FIG. 9, comparator D0 (1115) is used to determine the digital signal output state if the present signal transmission state is "full rail after transition". If the previous signal transmission state is "full rail with a positive orientation", comparator D1 (1117) outputs 1 when the signal difference $S_+-S_-$ is larger than the sum of voltage swings $(S_--V_L)-(S_+-V_H)$; and 0 when otherwise. When the previous signal transmission state is "full rail with a negative orientation", comparator D2 (1119) outputs 1 when the signal difference $S_+-S_-$ is larger than the sum of voltage swings $(S_--V_H)-(S_+-V_L)$; and 0 when otherwise. Multiplexers 915 and 917 select one from the results on lines 1141-1145 in the same way as those in FIG. 9.

When amplifiers A0-A6 (1101-1113) are not linear differential amplifiers, or linear differential amplifiers with different gains, the outputs of amplifiers A0, A5 and A6 represent combinations of input differential signal and reference voltages with various weights. In one embodiment of the present invention, amplifiers A0-A4 have a transfer function f; and amplifiers A5 and A6 have a transfer function g. The output of A0 passes through another comparator with the transfer function g so that the output of A0 is compared with voltage 0 before the result is input into comparators D1 (1117) and D2 (1119). Thus, when the transfer function g is substantially monotonic and the transfer function f is substantially symmetric about origin, the results of comparators D1 and D2 are equivalent to the results of comparing $f(S_+-S_-)$ to $f(S-V_L)+f(V_H-S_+)$ and comparing $f(S_--S_+)$ to $f(V_H-S_-)+f(S_+-V_L)$, and thus, equivalent to comparing the weighted signal difference to weighted sum of voltage swings for differential signals which were previously in "full rail" but with different orientations of polarity.

Figure 12:
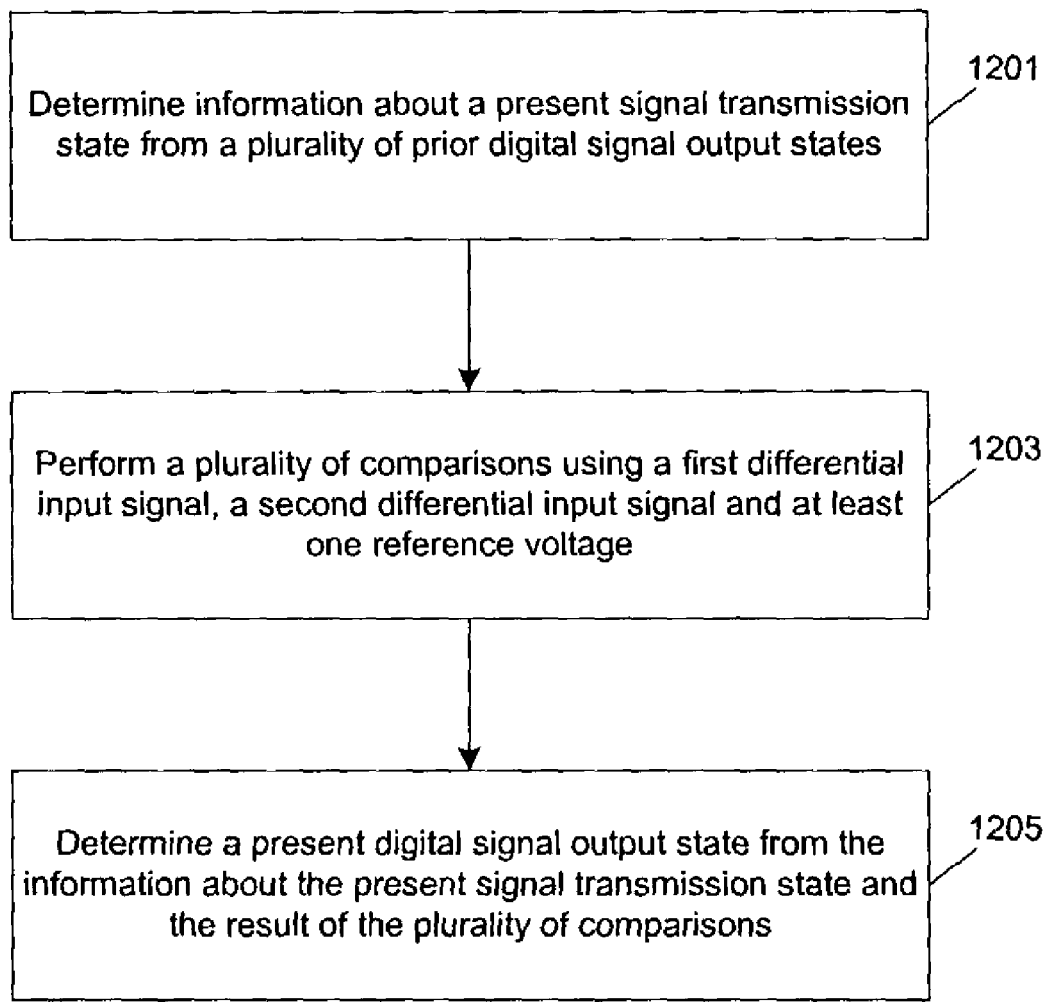
FIGS. 12-14 show flow charts of methods for determining digital signal output states according to various embodiments of the present invention.
Figure 13:
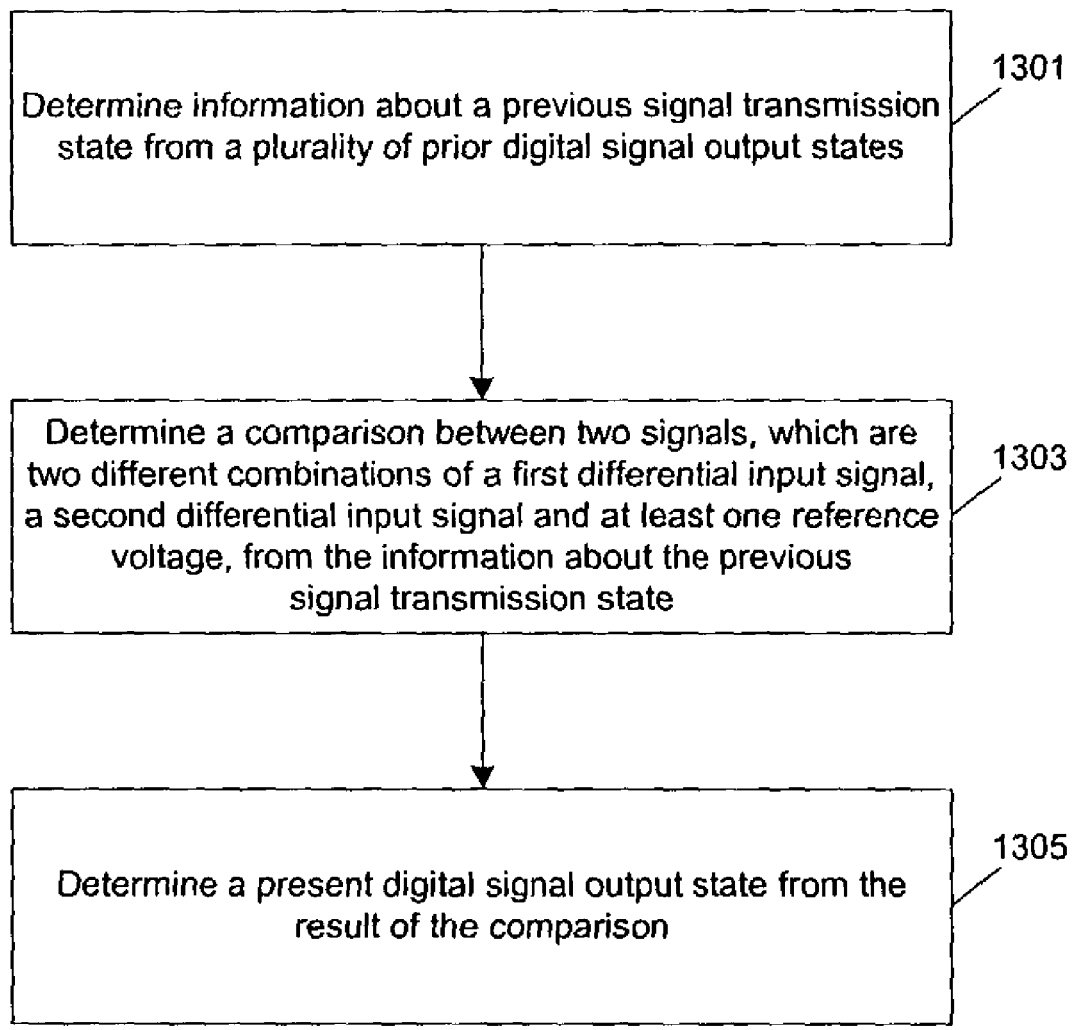
Figure 14:
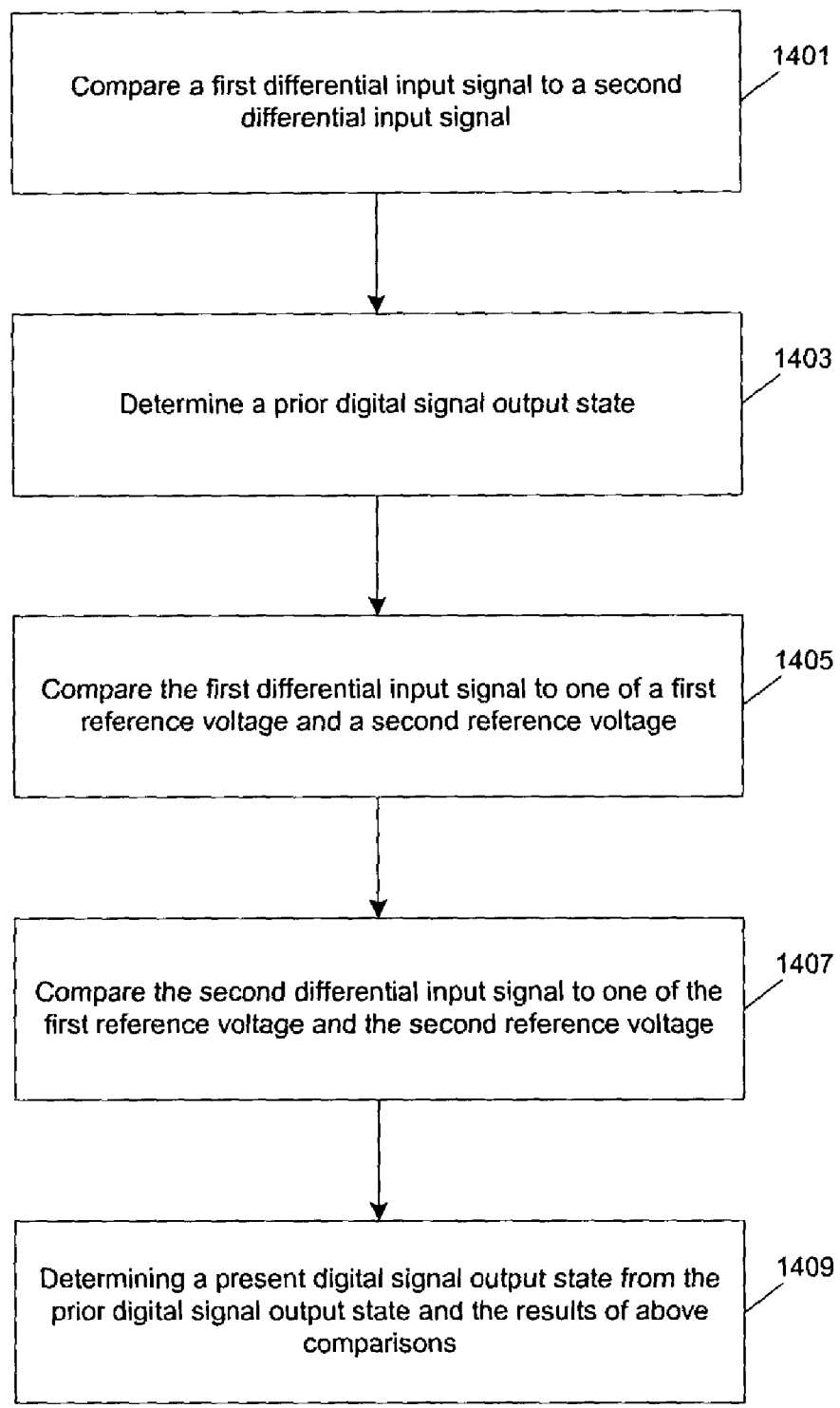

FIGS. 12-14 show flow charts of methods for determining digital signal output states according to various embodiments of the present invention.

In FIG. 12, operation 1201 determines information about a present signal transmission state from a plurality of prior digital signal output states. For example, it is determined whether or not a present signal transmission state is "full rail after transition" and whether or not the present differential signals are continued from those which were previously in a state of "full rail" with a positive or a negative orientation, as determined by logic units 919-931 in FIG. 9. Operation 1203 performs a plurality of comparisons using the differential input signals and at least one reference voltage. For example, comparators 901-909 perform a plurality of comparisons using the differential input signals and reference voltages. Operation 1205 determines the present digital signal output state from the present signal transmission state and the result of the plurality of comparisons. For example, logic units 911-937 determine the current digital signal output state from the result of the comparisons performed by comparators 901-909 and from the information determined by logic units 919-931.

In FIG. 13, operation 1301 determines information about a previous signal transmission state from a plurality of prior digital signal output states. For example, logic units 1019-1031 in FIG. 10 determine whether or not the previous signal transmission state is "transition" and whether the previous signal transmission is "full rail with a positive orientation" or "full rail with a negative orientation" if the previous signal transmission state is not "transition". Operation 1303 determines a comparison between two signals, which are two combinations of the differential input signals and at least one reference voltage from the information about the previous signal transmission state. For example, amplifiers 1001-1003 produce combinations of the differential input signals; comparators 1005-1009 compare the combinations of the differential input signals and reference signals; and logic units 1015-1017 determine a comparison by selecting one from lines 1041-1045 according to the information about the previous signal transmission state, determined from the prior digital signal output states (e.g., stored in flip-flops 1021 and 1023). Note that a weighting function unit (e.g., unit 511) may also generate signals which are combinations of the differential signals and the reference signals. It will be understood that a combination of several signals may have the contribution from only one of the several signals. In operation 1305, a present digital signal output state is determined from the result of the comparison.

FIG. 14 shows a detailed flow chart for determining the present digital signal output state according to one embodiment of the present invention. Operation 1401 compares a first differential input signal to a second differential input signal (e.g., comparing $S_+$ and $S_-$ in FIG. 5). Operation 1403 determines a prior digital signal output state. Typically, the prior digital signal output state is stored as a result of a prior operation for determining a digital signal output state. Operation 1405 compares the first differential input signal to one of a first reference voltage and a second reference voltage (e.g., comparing $S_+$ and $V_H$, or comparing $S_+$ and $V_L$); and operation 1407 compares the second differential input signal to one of the first reference voltage and the second reference voltage (e.g., comparing $S_-$ and $V_L$, or comparing $S_-$ and $V_H$). In some embodiment of the present invention, which one of the reference voltages is compared to the differential input signal is determined by the prior digital signal output state. For example, when the previous signal transmission state is "full rail", if the previous digital signal output state is 1, $S_+$ is compared to $V_H$, and $S_-$ is compared to $V_L$; and, if the previous digital signal output state is 0, $S_-$ is compared to $V_L$, and $S_+$ is compared to $V_H$. Finally, the present digital signal output state is determined from the prior digital signal output state and the results of above comparisons in operations 1401, 1405 and 1407. For example, results of $S_+-S_-$, $V_H-S_+$, and $S_--V_L$ may be combined as $(S_+-S_-)-[(V_H-S_+)+(S_--V_L)]$ to determine the digital signal output state when the previous signal transmission state is "full rail with a positive orientation".

Figure 15:
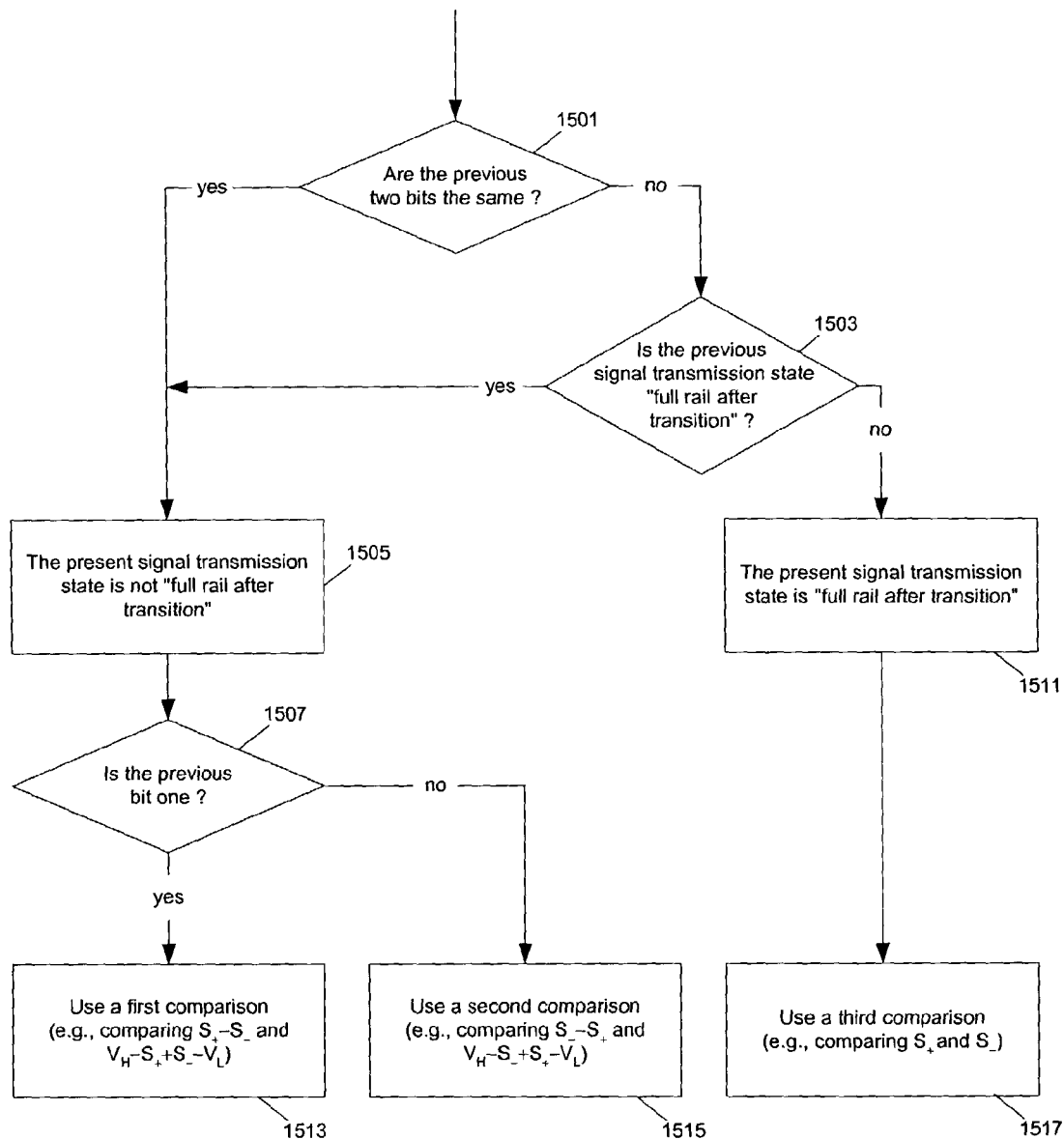
FIG. 15 shows a flow chart of a method to determine information about a previous signal transmission state for selecting a result from a plurality of comparisons according to one embodiment of the present invention.

FIG. 15 shows a flow chart of a method to determine information about a present signal transmission state for selecting one from a plurality of comparisons according to one embodiment of the present invention. Operation 1501 determines whether or not the two previous digital output signals are the same. If they are not the same, operation 1503 determines whether or not the previous signal transmission state is "full rail after transition". If the previous signal transmission state is not "full rail after transition", the present signal transmission state is "full rail after transition" (1511), and a third comparison is selected to determined the present digital signal output (e.g., comparing $S_+$ and $S_-$) in operation 1517; otherwise, the present signal transmission state is not "full rail after transition" (1505), which implies that the previous signal transmission state is "full rail". If operation 1501 determines that the two previous digital output signals are the same, the present signal transmission state is not "full rail after transition". Operation 1507 then determines whether or not the previous digital signal output state is one. When the previous digital signal output state is one, the present signal transmission state continues from a state of "full rail with a positive orientation", and a first comparison is used to determined the present digital signal output (e.g., comparing $S_+-S_-$ and $(V_H-S_+)+(S_--V_L)$); otherwise, the present signal transmission state continues from a state of "full rail with a negative orientation", and a second comparison is used to determined the present digital signal output (e.g., comparing $S_--S_+$ and $(V_H-S_-)+(S_+-V_L)$).

Figure 16:
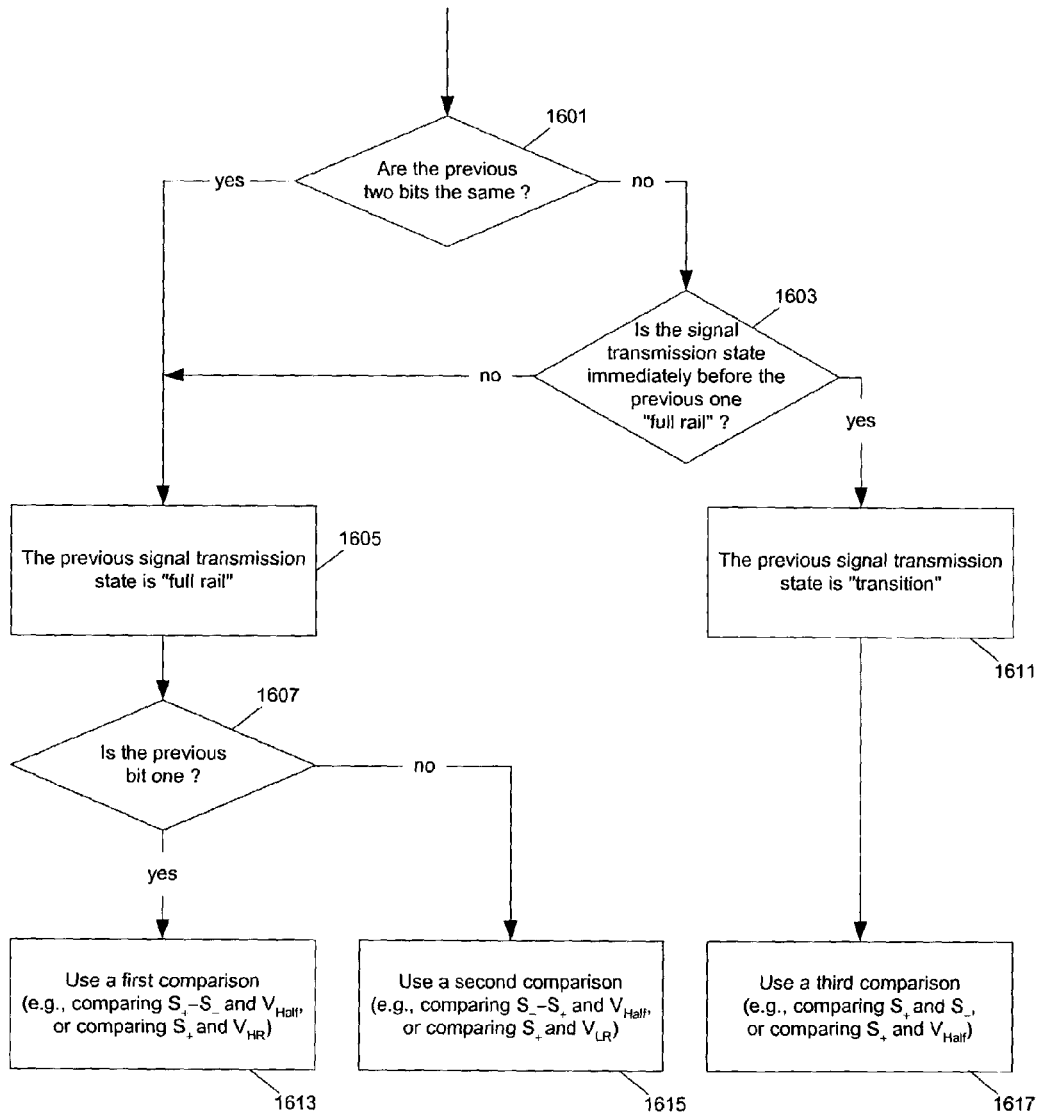
FIG. 16 shows a flow chart of a method to determine information about a previous signal transmission state for selecting a result from a plurality of comparisons according to one embodiment of the present invention.

FIG. 16 shows a flow chart of a method to determine information about a previous signal transmission state for selecting one from a plurality of comparisons according to one embodiment of the present invention. Operation 1601 determines whether or not the two previous digital output signals are the same. If they are the same, operation 1603 determines whether or not the signal transmission state immediately before the previous one is "full rail". If the signal transmission state immediately before the previous one is "full rail", the previous signal transmission state is "transition" (1611), and a third comparison is selected to determined the present digital signal output (e.g., comparing $S_+$ and $S_-$, or comparing $S_+$ and $V_{Half}$); otherwise, the previous signal transmission state is "full rail" (1605). If operation 1601 determines that the two previous digital output signals are the same, the previous state is "full rail". Operation 1607 determines whether or not the previous digital signal output state is one. When the previous digital signal output state is one, the previous signal transmission state is "full rail with a positive orientation", and a first comparison is used to determined the present digital signal output (e.g., comparing $S_+-S_-$ and $V_{Half}$, or comparing $S_+$ and $V_{HR}$); otherwise, the previous signal transmission state is "full rail with a negative orientation", and a second comparison is used to determined the present digital signal output (e.g., comparing $S_--S_+$ and $V_{Half}$, or comparing $S_+$ and $V_{LR}$).

From comparing the methods in FIGS. 15 and 16, it can be seen that the information about the previous signal transmission state is closely related to the information about the present signal transmission state, since the current differential signals continue from the previous signal transmission state. The information about the previous signal transmission state can be associated with the present signal transmission state. The information about the previous signal transmission state determines the signal levels for transmitting the previous digital symbol, which indicate the possible signal levels for transmitting the present digital symbol. The possible signal levels for transmitting the present digital symbol are, at least, part of the information about the present signal transmission state, which can be used in detecting the current digital signal output state.

Figure 18:
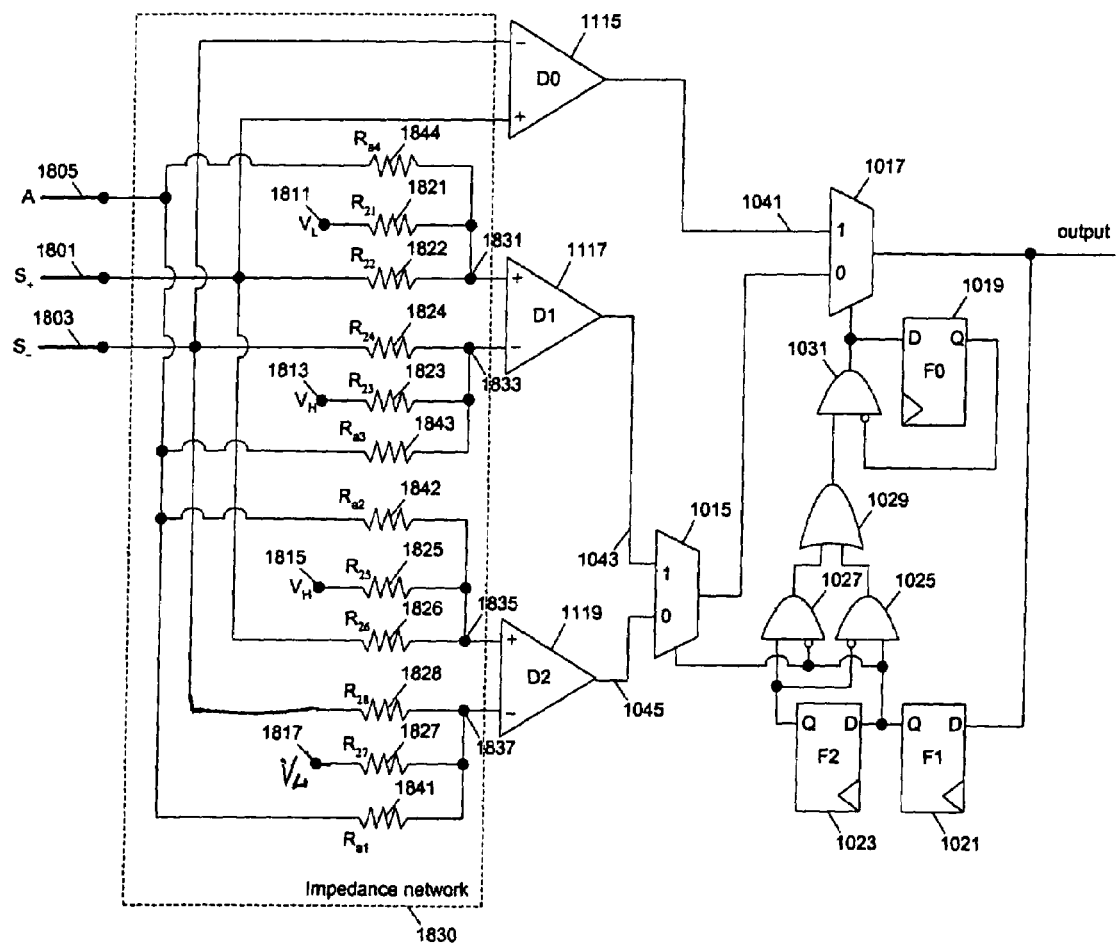
FIGS. 18-19 show schematic diagrams of differential signal receivers according to other embodiments of the present invention.
Figure 19:
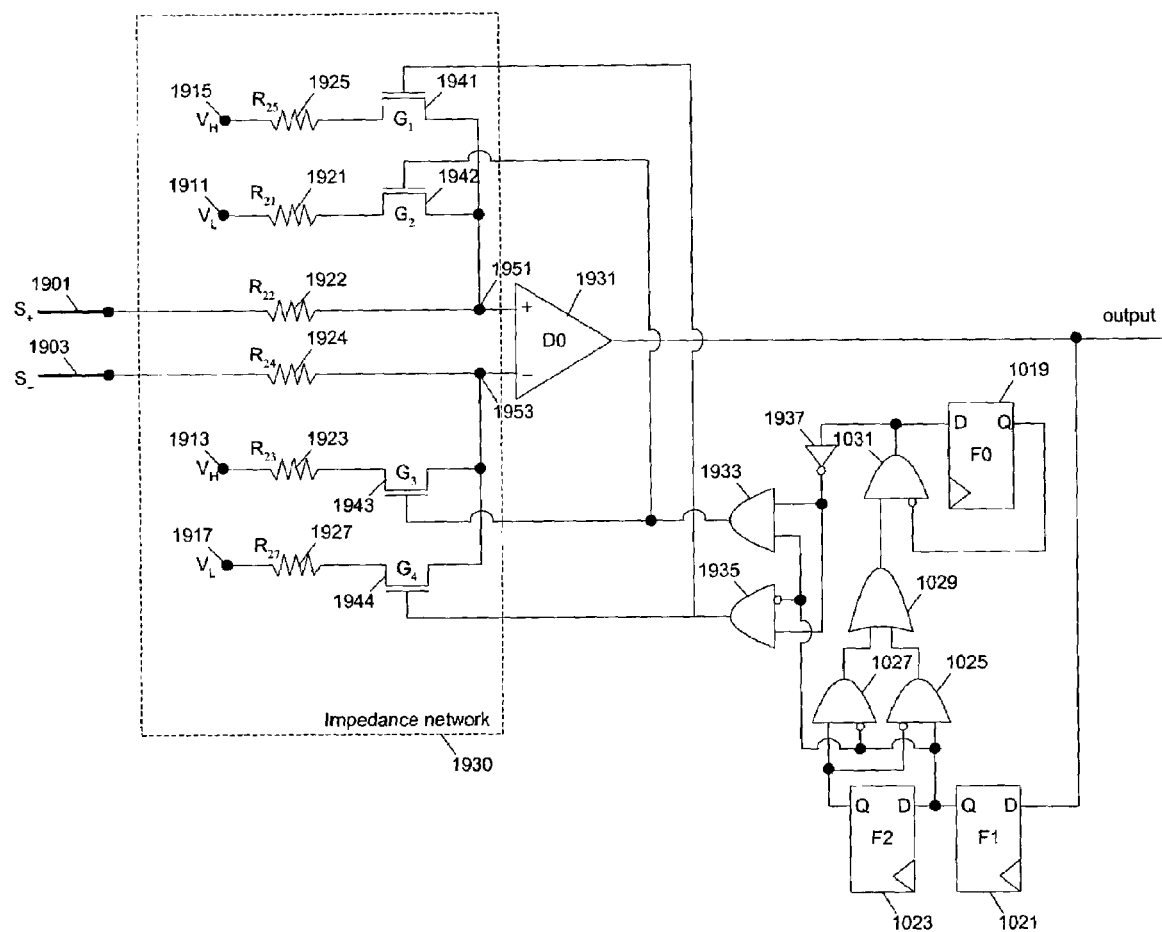

FIGS. 18-19 show schematic diagrams of differential signal receivers according to other embodiments of the present invention.

While FIG. 11 shows an embodiment of the present invention where amplifiers 1101-1113 are used to generate input signals for comparators 1117 and 1119 for detecting the presently transmitted digital symbol when the previous signal transmission state is "full rail", FIG. 18 shows an embodiment of the present invention where impedance network 1830 is used to generate the corresponding input signals for comparators 1117 and 1119. Using the prior determined digital signal output states, logic units 1015-1031 select the result from line 1041 if the previous signal transmission state is "transition"; from line 1043 if the previous signal transmission state is "full rail with a positive orientation"; and from line 1045 if the previous signal transmission state is "full rail with a negative orientation".

In FIG. 18, resistors $R_{21}$ and $R_{22}$ (1821 and 1822) combine signal $S_+$ and reference voltage $V_L$ (1811) to generate the first input signal (1831) for comparator D1 (1117). Similarly, resistors $R_{23}$ and $R_{24}$ (1823 and 1824) combine signal $S_-$ and reference voltage $V_H$ (1813) to generate the second input signal (1833) for comparator D1. The resistances of $R_{21}$, $R_{22}$, $R_{23}$ and $R_{24}$ can be chosen such that input signals 1831 and 1833 can be used to reliably detect the digital symbol when the previous signal transmission state is "full rail with a positive orientation". For example, if transmission line 1801 has an impedance $Z_0$, $R_2$, can be chosen to be $(R_{22}+Z_0)/2$. Thus, input signal 1831 is $(V_L+2 S_+)/3$. Similarly, if transmission line 1803 has an impedance $Z_0$, $R_{23}$ can be chosen to be $(R_{24}+Z_0)/2$ so that input signal 1833 is $(V_H+2 S_-)/3$. Thus, comparator 1117 compares $(V_L+2 S_+)/3$ to $(V_H+2 S_-)/3$, which is mathematically equivalent to comparing $S_+-S_-$ and $(V_H-S_+)+(S_--V_L)$, the input signals for comparator 1117 in FIG. 11. Note that the generated signals 1831 and 1833 do not have to be exactly $(V_L+2 S_+)/3$ and $(V_H, +2 S_-)/3$, as long as signals 1831 and 1833 can be used to reliably determine the present digital symbol when the previous signal transmission state is "full rail with a positive orientation".

Similarly, resistors $R_{25}$, $R_{26}$, $R_{27}$ and $R_{28}$ can be chosen such that signals 1835 and 1837 are $(V_H+2 S_+)/3$ to $(V_L+2 S_-)/3$ respectively. Thus, comparator 1119 compares $(V_H+2 S_+)/3$ to $(V_L+2 S_-)/3$, which is equivalent to comparing $S_+-S\_0$ and $(V_L-S_+)+(S_--V_H)$, the input signals for comparator 1119 in FIG. 11. Therefore, comparator 1119 can reliably determine the present transmitted digital symbol, when the previous signal transmission state is "full rail with a negative orientation".

When the previous signal transmission state is "transition", comparator 1115 compares $S_+$ to $S_-$ to determine the present transmitted digital symbol.

Figure 21:
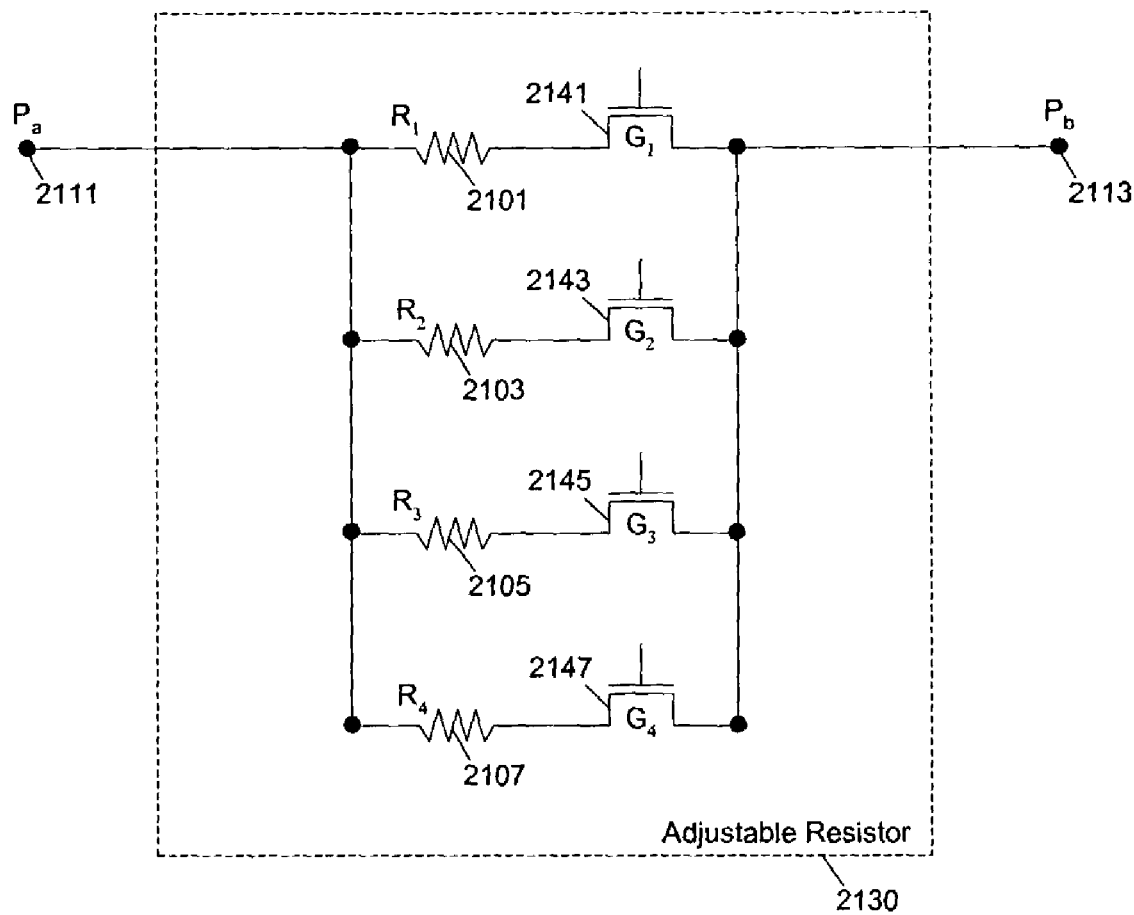
FIG. 21 shows a schematic diagram of an adjustable resistor which can be used in an impedance network according to one embodiment of the present invention.

In one embodiment of the present invention, a portion of signal A from the neighboring transmission line 1805 is introduced into signals 1835 and 1837 to reduce or eliminate the effect of cross talk through adjustable resistors $R_{a1}$ (1841) and $R_{a2}$ (1842). Resistors $R_{a1}$ and $R_{a2}$ can be chosen so that signals 1835 and 1837 have substantially equal amounts of signal A, after the portions of signal A introduced by resistors $R_{a1}$ and $R_{a2}$ are combined with the corresponding signal due to cross talk. An example of adjustable resistor is illustrated in FIG. 21 and described further below. In one embodiment of the present invention, the adjustable resistors (e.g., $R_{a1}$ and $R_{a2}$) are configurable after the system is built so that the amounts of the signal A can be adjusted according to the real condition of the wiring. FIG. 18 illustrated a general situation where signal A introduced in both signals 1835 and 1837. When it can be predetermined that transmission line 1805 causes more cross talk in line 1801 than in line 1803, the branch of resistor $R_{a2}$ may be eliminated; and, resistor $R_{a1}$ can introduce a portion of signal A into signal 1837 to balance the amount of the component of signal A in signals 1837 and 1835. When the wiring condition is predetermined, resistors $R_{a1}$ and $R_{a2}$ can have predetermined fix values. Similarly, adjustable resistors $R_{a1}$ and $R_{a2}$ are used for eliminating or reducing the cross talk due to neighboring line 1805. Further, adjustable resistors (not shown in FIG. 18) can be used to eliminate or reduce cross talk effects for comparator 1115 in a similar fashion as for comparators 1117 and 1119.

In FIG. 19, logic units 1019-1031 and 1933-1937 selectively couple resistors 1921, 1923, 1925 and 1927 to the input points of comparator 1931, according to the prior transmitted digital symbols, so that signals 1951 and 1953 for comparator 1931 can be used to reliably determine the current digital symbol. Logic units 1019-1031 determine if the previous signal transmission state is "transition", "full rail with a positive orientation", or "full rail with a negative orientation". Logic units 1933-1937 combine the outputs of flip-flop F1 (1021) and unit 1031 to control gates $G_1$-$G_4$ (1941-1944). When the previous signal transmission state is "transition", unit 1031 outputs one, and both logic units 1933 and 1935 output zero; when the previous signal transmission state is "full rail with a positive orientation", logic unit 1933 outputs one and 1935 outputs zero; when the previous signal transmission state is "full rail with a negative orientation", logic unit 1935 outputs one and 1933 outputs zero.

Thus, when the previous signal transmission state is "transition", gates 1941-1944 are open; signals 1951 and 1953 are equal to $S_+$ and $S_-$ respectively; and comparator 1931 compares $S_+$ to $S_-$ to determine the current transmitted digital symbol.

When the previous signal transmission state is "full rail with a positive orientation", gates 1941 and 1944 are open; gates 1942 and 1943 are closed; signals 1951 and 1953 are determined by resistors $R_{21}$, $R_{22}$, $R_{23}$ and $R_{24}$ (1921-1924); similar to generating signals 1831 and 1833 in FIG. 18, $R_{21}$, $R_{22}$, $R_{23}$ and $R_{24}$ can be chosen such that signals 1951 and 1953 are $(V_L+2\ S_+)/3$ and $(V_H+2\ S_-)/3$ respectively. Thus, comparator 1931 can reliably determine the presently transmitted digital symbol when the previous signal transmission state is "full rail with a positive orientation".

When the previous signal transmission state is "full rail with a negative orientation", gates 1941 and 1944 are closed; gates 1942 and 1943 are open; signals 1951 and 1953 are determined by resistors $R_{25}$, $R_{22}$, $R_{27}$ and $R_{24}$ (1925, 1922, 1927 and 1924); similar to generating signals 1835 and 1837 in FIG. 18, $R_{25}$ and $R_{27}$ can be chosen such that signals 1951 and 1953 are $(V_H+2\ S_+)/3$ and $(V_L+2\ S_-)/3$ respectively. Thus, comparator 1931 can reliably determine the presently transmitted digital symbol when the previous signal transmission state is "full rail with a negative orientation".

Therefore, logic units 1933 and 1935 control the impedance network 1930 to generate signals 1951 and 1953 according to the prior digital signal output states. Signals 1951 and 1953 are combinations of the transmitted signals ($S_+$ and $S_-$) and reference signals (e.g., reference voltages 1911-1917). The reference voltages 1911-1917 are held substantially constant.

Figure 20:
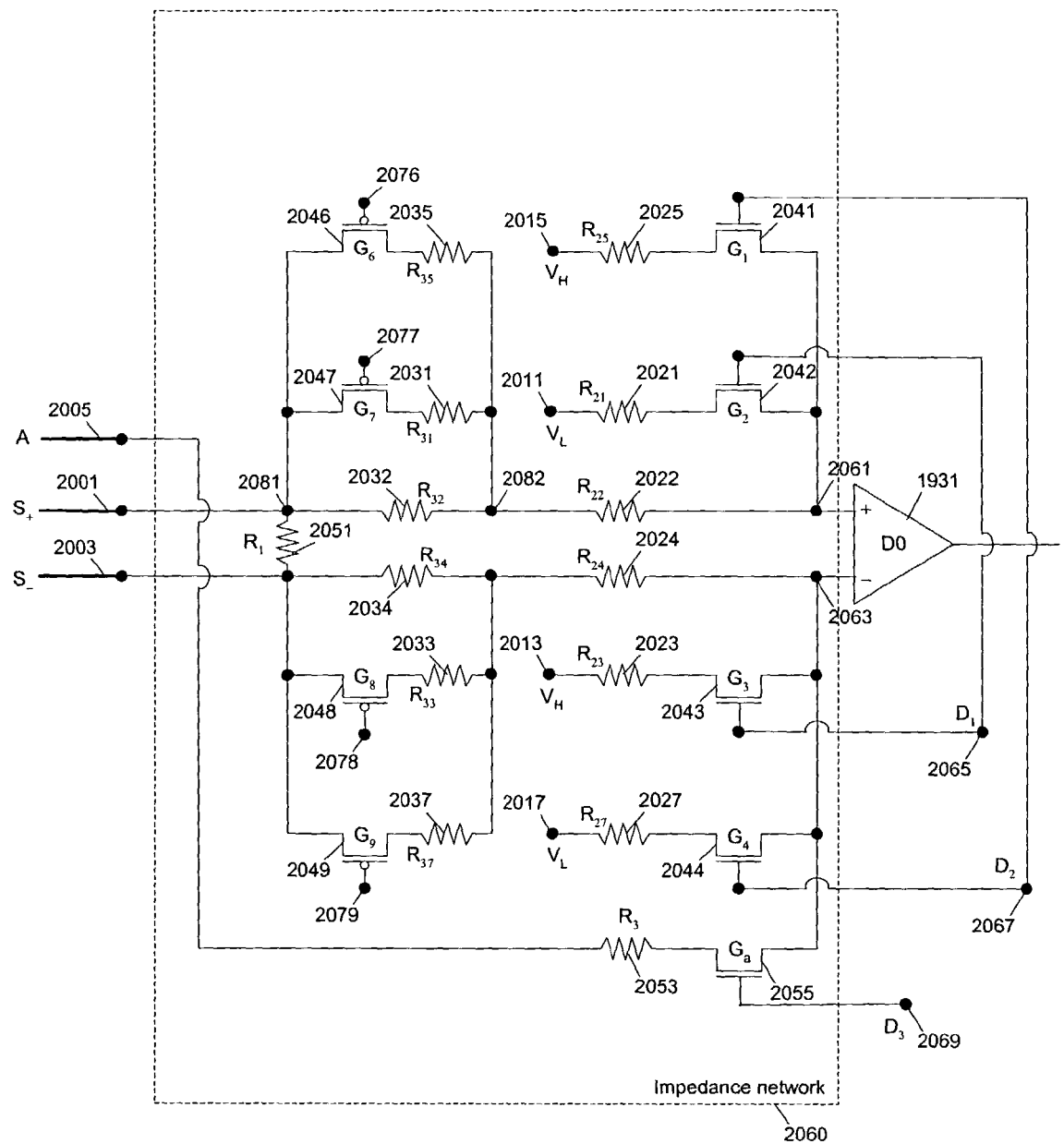
FIG. 20 shows a schematic diagram of an impedance network according to one embodiment of the present invention.

FIG. 20 shows a schematic diagram of an impedance network according to one embodiment of the present invention. Gates $G_1$-$G_4$ selectively couple resistors $R_{25}$ (2025), $R_{21}$ (2021), $R_{23}$ (2023), and $R_{27}$ (2027) to the input ends of comparator 1931 to combine reference voltages 2011-2017 with transmitted signals ($S_+$ and $S_-$). Further, gates $G_6$-$G_9$ selectively couple resistors $R_{35}$ (2035), $R_{31}$ (2031), $R_{33}$ (2033), and $R_{37}$ (2037) to resistor $R_1$ (2051) in order to provide desirable terminal impedance $Z_d$ for signal transmission lines 2001 and 2003. In general, gates $G_6$-$G_9$ are controlled by different signals 2076-2079, which may be derived from previously received digital symbols. Although FIG. 20 illustrates an example of using two switched branches of resistors for adjusting the impedance between points 2081 and 2082, it is understood that in general an adjustable resistor (e.g., as illustrated in FIG. 21 and described further below) of multiple branches can be used.

In one embodiment of the present invention, control signals (2076-2079) for gates $G_6$-$G_9$ are derived from control signals D1 (2065) and $D_2$ (2067). For example, signals 2076 and 2079 are the same as signal $D_2$ (2067); and, signals 2077 and 2078 are the same as signal $D_1$ (2065). In such an example, when the previous signal transmission state is "transition", both signals $D_1$ (2065) and $D_2$ (2067) are zero so that gates $G_1$-$G_4$ de-couple the corresponding resistors; and gates $G_6$-$G_9$ couple the corresponding resistors to $R_{32}$ and $R_{34}$. Suitable resistors $R_1$, $R_{22}$ and $R_{24}$ can be used to provide the terminal impedance $Z_d$ for signal transmission lines 2001 and 2003; and signals 2061 and 2063 are equal to $S_+$ and $S_-$ respectively.

When the previous signal transmission state is "full rail with a positive orientation", $D_1$ is one and $D_2$ is zero. Gates $G_2$ and $G_3$ couple resistors $R_{21}$ and $R_{23}$ to the corresponding input ends of comparator 1931 to generate suitable signals 2061 and 2063 (e.g., $(V_L+2\ S_+)/3$ and $(V_H+2\ S_-)/3$). At the same time, since connecting the branches of $R_{21}$ and $R_{23}$ to the input ends of comparator 1931 may reduce the impedance of the receiver, gates $G_7$ and $G_8$ de-couple the branches of $R_{31}$ and $R_{33}$ to compensate the reduction in order to maintain the terminal impedance $Z_d$.

Similarly, when the previous signal transmission state is "full rail with a negative orientation", $D_1$ is zero and $D_2$ is one. Gates $G_1$ and $G_4$ couple resistors $R_{25}$ and $R_{27}$ to the corresponding input ends of comparator 1931 to generate suitable signals 2061 and 2063 (e.g., $(V_H+2\ S_+)/3$ and $(V_L+2\ S_-)/3$). At the same time, gates $G_6$ and $G_9$ de-couple the branches of $R_{35}$ and $R_{37}$ to compensate the reduction in impedance due to the branches of $R_{25}$ and $R_{27}$.

FIG. 20 illustrates a situation where gates $G_1$ and $G_4$ are controlled by the same signal $D_2$ and gates $G_2$ and $G_3$ are controlled by the same signal $D_1$. However, it will be appreciated that, in general, the gates $G_1$-$G_4$ can be individually controlled by different control signals to combine the reference signals and input signals in various forms, using the previously received digital symbols, according to embodiments of the present invention. Further, additional reference signals (or other reference signals) (not shown in FIG. 20) can be combined with the received input signals through additional branches of adjustable (or variable) resistors (e.g., controlled through control gates); and, less branches may also be used to obtain certain combinations.

Gate $G_a$ (2055) introduces a portion of signal A into signal 2063 to reduce or eliminate the effect of cross talk due to the neighboring transmission line 2005. Resistor $R_3$ (2053) can be chosen so that the portion of signal A that is combined into signal 2063 is proportional to the cross talk induced signal in signal 2061. Further, a portion of the complementary signal of signal A can be combined into signal 2061 through another resistor (not shown in FIG. 20) to reduce cross talk. Thus, impedance network 2060 can reduce or eliminate cross talk effects by combining signals received from transmission lines. Although FIG. 20 illustrates an situation where a portion of signal A is introduced into signal 2063 through resistor 2053, it is understood that in general resistors (e.g., adjustable or fixed) can be used to introduce portions of signal A into both signals 2063 and 2061 for eliminating or reducing cross talk. Further, the control signal for adjusting the adjustable resistors (e.g., for the control of cross talk, or for the control of the input impedance of the receiver) can be adaptive to the real time communication situation. For example, test signals may be sent through the communication line while the receiver automatically determines (or searches for) the optimum value for various signal transmission states.

In FIG. 20, resistors $R_{35}$ and $R_{31}$ and gates $G_6$ and $G_7$ form an adjustable resistor, which is used to compensate the impedance changes due to the different connection states of the branches of $R_{25}$ and $R_{21}$. Adjustable resistors can be further used for the purpose of impedance calibration and optimization.

FIG. 21 shows a schematic diagram of an adjustable resistor which can be used in an impedance network according to one embodiment of the present invention. Although four branches are used for illustration purpose, it is understood that a different number of branches and gates can be used in constructing an adjustable resistor. Each of gates $G_1$-$G_4$ can be individually control to couple or de-couple the corresponding branch to points $P_a$ (2111) and $P_b$ (2113). Thus, a particular set of control signals for gates $G_1$-$G_4$ can be used to select an effective resistance between $P_a$ and $P_b$ for adjustable resistor 2130; and different sets of control signals can be used to tune the impedance of adjustable resistor 2130. Such an adjustable resistor can be used in impedance network 1830 (or 1930) so that the signal receiver has desirable terminal impedance $Z_d$ for signal lines 1801 and 1803. Control signals can be used to calibrate the terminal impedance and to optimize the combined signals (e.g., signals 1831 and 1833) for symbol detection.

Although impedance networks 1830, 1930 and 2060 are illustrated with resistors, from this description it will be apparent to one skilled in the art that the capacitors can also be used in the impedance network in generating combined signals. Further, capacitors have frequency dependent impedances. Therefore, capacitors can be used in constructing "matched filters" in the impedance network to compensate the frequency dependent attenuation (e.g., skin effect).

Although the examples of various embodiments of the present invention are illustrated using differential signaling systems, it is apparent to one skilled in the art from this description that at least some embodiments of the present invention can be used in other types of signaling systems. For example, FIG. 16 includes a method to determine a previous signal transmission state for selecting one from: comparing $S_-$ with $V_{Half}$; comparing $S_+$ with $V_{HR}$; or, comparing $S_+$ with $V_{LR}$. Since the plurality of comparisons involves only one transmitted signal, such a method can be readily used in a single ended signaling system. Further, various methods of the present invention can be applied to multi-line signaling system. Thus, previously determined digital signal output states can be used to generate combined signals from various combinations of the transmitted signal (or transmitted signals) and references signals in order to reliably detect transmitted digital symbols in all situations so that the probabilities for correctly detecting transmitted digital symbols are well balanced among all scenarios of transmission in a high speed signaling system. The frequency of transmitted signals in such a high speed signaling system can be 500 MHz or higher (e.g., multi GHz); however, it is understood that the present invention can also be used with signals at a lower frequency.

Although the examples of various embodiments of the present invention are illustrated using a signaling system where two bits are transmitted when differential signals swing from one rail to the other, it is apparent to one skilled in the art from this description that the present invention can also be used in a signaling system where more than two bits are transmitted when the differential signals swing from one rail to the other. For example, a ⅓-rail voltage swing may be used to indicate a change in the digital symbol being transmitted; and a number of previous transmitted bits can be used to determine the previous voltage level (e.g., at full rail, or ⅓-rail away from the full rail), which can be used to determine a combination (weighting) scheme for signal detection using the transmitted signal and predetermined reference voltages. When the ratio of the number of bits transmitted over the harmonic frequency of the transmitting signal is increased, reliable systems of higher communication speeds can be supported on existing communication wire lines.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a bus receiver for determining a digital signal state in a differential signaling system, said method comprising:
   comparing a first differential input signal received by the bus receiver at a current time to a second differential input signal received by the bus receiver at the current time;
   determining a prior digital signal output state, wherein the prior digital signal output state is determined at the time prior to the current time;
   determining a previous signal transmission state of differential signals from the prior digital signal output state, wherein the signal transmission state of the differential signals indicates a signal level of the first differential input signal relative to the second differential input signal to transmit a digital symbol;
   comparing, in the bus receiver, said first differential input signal to one of a first reference voltage and a second reference voltage based on the prior digital signal output state;
   comparing said second differential input signal to one of said first reference voltage and said second reference voltage; and
   determining a present digital signal output state of the current time from said determining said prior digital signal output state and from all of said comparings.

2. A method as in claim 1 wherein said determining said present digital signal output state comprises:

weighting results of all of said comparings with weights determined from the plurality of prior digital signal output states.

3. A method as in claim 2 wherein the results of all of said comparings indicate differences between corresponding signals being compared.

4. A method as in claim 2 wherein the results of all of said comparings are substantially linear with respect to differences between corresponding signals being compared.

5. A method as in claim 1 wherein said prior digital signal output state determines which one of said first reference voltage and said second reference voltage is compared to said first differential input signal.

6. A method as in claim 1 further comprising:
determining weights to results of all of said comparings according to the previous signal transmission state; and
weighting the results of all of said comparings with said weights in determining the present digital signal output state.

7. A method, in a bus receiver to determine a digital signal state in a differential signaling system, said method comprising:
determining, in the bus receiver, information about a present signal transmission state of differential signals at a current time from a prior digital signal output state, wherein the prior digital signal output state is determined at the time prior to the current time, the information about the present signal transmission state of differential signals of the current time indicating possible transmitted signal levels of the differential signals relative to each other to transmit a digital symbol for the present signal transmission state;
performing a plurality of comparisons, in the bus receiver, using a first differential input signal of the current time, a second differential input signal of the current time and at least one reference signal based on the information about the present signal transmission state; and
determining a present digital signal output state of the current time from the information about the present signal transmission state and results of the plurality of comparisons.

8. A method as in claim 7 further comprising:
comparing two of the plurality of prior digital signal output states in determining the information about the present signal transmission state.

9. A method as in claim 8 further comprising:
storing the information about the present signal transmission state;
wherein the information about the present signal transmission state is determined from the plurality of prior digital signal output states and information about a prior signal transmission state.

10. A method as in claim 7 further comprising:
determining weights to the results of the plurality of comparisons according to the information about the present signal transmission state; and
weighting the results of the plurality of comparisons with the weights in determining the present digital signal output state.

11. A method as in claim 10 wherein the at least one reference signal is predetermined.

12. A method as in claim 7 wherein said determining the present digital signal output state comprises:
combining the results of the plurality of comparisons into a plurality of intermediate results; and
selecting one from the plurality of intermediate results as the present digital signal output state using the information about the present signal transmission state.

13. A method as in claim 12 wherein the results of the plurality of comparisons are substantially linear with respect to differences between corresponding signals being compared.

14. A method to determine a digital signal state in a high speed signaling system at a bus signal receiver, said method comprising:
determining, in the bus signal receiver, a previous signal transmission state of differential signals from a prior digital signal output state, wherein the prior digital output state is determined at a time prior to a current time, wherein the signal transmission state of the differential signals indicates signal levels of the differential signals relative to each other to transmit a digital symbol;
performing, in the bus signal receiver, a comparison between two signals of the current time based on the previous signal transmission state of the differential signals, the two signals being two combinations of at least one received input signal and at least one reference signal, at least one of the two combinations including one of the at least one reference signal; and
determining a present digital signal output state of the current time from the comparison.

15. A method as in claim 14 wherein each of the two combinations includes one of the at least one reference signal.

16. A method as in claim 14 wherein one of the two combinations is obtained from at least one differential amplifier.

17. A method as in claim 14 wherein one of the two combinations is obtained from an impedance network.

18. A method as in claim 17 wherein the impedance network comprises an adjustable resistor controlled according to the previous signal transmission state.

19. A method as in claim 18 wherein the previous signal transmission state and the plurality of prior digital signal output states control the adjustable resistor.

20. A method as in claim 19 wherein the adjustable resistor comprises a plurality of resistors connected together through a plurality of gates.

21. A method as in claim 14 further comprising:
adjusting an adjustable resistor according to the plurality of prior digital signal output states to control an impedance of the signal receiver.

22. A method as in claim 14 wherein the at least one received input signal comprises a pair of differential signals.

23. A method as in claim 22 wherein the speed of the differential signals is above 500 MHz.

24. A method as in claim 22 wherein the at least one received input signal further comprises a signal from a neighboring signal line.

25. A method as in claim 24 wherein the signal from the neighboring signal line is combined into at least one of the two combinations to reduce effect of crosstalk from the neighboring signal line.

26. A method as in claim 25 wherein at least one adjustable resistor is used to combine the signal from the neighboring signal line into the at least one of the two combinations.

27. A method as in claim 26 further comprising:
adjusting the at least one adjustable resistor to optimize the reduction of crosstalk effect from the neighboring signal line.

28. A method as in claim 14 wherein the two combinations are determined from the previous signal transmission state and the plurality of prior digital signal output states.

29. A method as in claim 14 further comprising:
selecting the comparison from a plurality of comparisons according to the previous signal transmission state and the plurality of prior digital signal output states.

30. A method as in claim 29 wherein the two combinations are predetermined.

31. A method as in claim 30 wherein the two combinations are substantially linear.

32. A method as in claim 14 wherein the previous signal transmission state is determined from the plurality of prior digital signal output states and a signal transmission state prior to the previous signal transmission state.

33. A method to reduce crosstalk effect at a bus signal receiver, the method comprising:
generating a first combined signal, the first combined signal comprising a first differential input signal of a current time and a signal from a neighboring signal line;
generating a second combined signal, the second combined signal comprising a second differential input signal of the current time;
comparing, in the bus signal receiver, the first and second combined signals of the current time to determine a present digital signal output state at the current time, wherein the first and second combined signals are compared based on a prior digital signal output state that is determined at the time prior to the current time; and
determining a previous signal transmission state of differential signals based on the prior digital signal output state, wherein the signal transmission state indicates signal levels of the differential signals relative to each other to transmit a digital symbol.

34. A method as in claim 33 wherein the second combined signal comprises the signal from the neighboring signal line.

35. A method as in claim 33 wherein the second combined signal further comprises at least one predetermined reference signal.

36. A method as in claim 35 wherein the first combined signal further comprises at least one predetermined reference signal.

37. A method as in claim 33, wherein
the previous signal transmission state of differential signal is determined from a plurality of prior digital signal output states; and
wherein the first and second combined signals are compared according to the previous signal transmission state of the differential signals.

38. A bus signal receiver for determining a digital signal state in a differential signaling system, said receiver comprising:
means for comparing a first differential input signal received by the bus signal receiver at a current time to a second differential input signal received by the bus signal receiver at the current time;
means for determining a prior digital signal output state, wherein the prior digital signal output state is determined at the time prior to the current time;
means for determining a previous signal transmission state of differential signals from the prior digital signal output state, wherein the signal transmission state of the differential signals indicates a signal level of the first differential input signal relative to the second differential input signal to transmit a digital symbol;
means for comparing, in the bus signal receiver, said first differential input signal to one of a first reference voltage and a second reference voltage based on the prior digital signal output state;
means for comparing said second differential input signal to one of said first reference voltage and said second reference voltage; and
means for determining a present digital signal output state of the current time from said means for determining said prior digital signal output state and from all of said means for comparing.

39. A signal receiver as in claim 38 wherein said means for determining said present digital signal output state comprises:
means for weighting results of all of said comparings with weights determined from a plurality of prior digital signal output states.

40. A signal receiver as in claim 39 wherein the results of all of said comparings represent differences between corresponding signals being compared.

41. A signal receiver as in claim 39 wherein the results of all of said means for comparings are substantially linear with respect to differences between corresponding signals being compared.

42. A signal receiver as in claim 38 wherein said prior digital signal output state determines which one of said first reference voltage and said second reference voltage is compared to said first differential input signal.

43. A signal receiver as in claim 38 wherein said means for determining the present digital signal output state comprises:
means for determining weights to results of all of said comparings according to the previous signal transmission state; and
means for weighting the results of all of said comparings with said weights.

44. A bus signal receiver to determine a digital signal state in a differential signaling system, said receiver comprising:
means for determining, in the bus receiver, information about a present signal transmission state of differential signals at a current time from a prior digital signal output state, wherein the prior digital signal output state is determined at the time prior to the current time, the information about the present signal transmission state of differential signals of the current time indicating possible transmitted signal levels of the differential signals relative to each other to transmit a digital symbol for the present signal transmission state;
means for performing a plurality of comparisons, in the bus receiver, using a first differential input signal of the current time, a second differential input signal of the current time and at least one reference signal based on the information about the present signal transmission state; and
means for determining a present digital signal output state of the current time from the information about the present signal transmission state and results of the plurality of comparisons.

45. A signal receiver as in claim 44 wherein said means for determining the information about the present signal transmission state comprises:
means for comparing two of the plurality of prior digital signal output states.

46. A signal receiver as in claim 45 further comprising:
means for storing the information about the present signal transmission state;
wherein the previous signal transmission state is determined from the plurality of prior digital signal output states and information about a prior signal transmission state.

47. A signal receiver as in claim 44 wherein said means for determining the present digital signal output state comprises:

means for determining weights to the results of the plurality of comparisons according to the information about the present signal transmission state; and means for weighting the results of the plurality of comparisons with the weights.

48. A signal receiver as in claim 47 wherein the at least one reference signal is predetermined.

49. A signal receiver as in claim 44 wherein said means for determining the present digital signal output state comprises:

means for combining the results of the plurality of comparisons into a plurality of intermediate results; and means for selecting one from the plurality of intermediate results as the present digital signal output state using the information about the present signal transmission state.

50. A signal receiver as in claim 49 wherein the results of the plurality of comparisons are substantially linear with respect to differences between corresponding signals being compared.

51. A bus signal receiver to determine a digital signal state in a communication link, said receiver comprising:

means for determining, in the bus signal receiver, a previous signal transmission state of differential signals from a prior digital signal output state, wherein the prior digital output state is determined at a time prior to a current time, wherein the signal transmission state of the differential signal indicates signal levels of the differential signals relative to each other to transmit a digital symbol;

means for performing, in the bus signal receiver, a comparison between two signals of the current time based on the previous signal transmission state of the differential signals, the two signals being two combinations of at least one received input signal and at least one reference signal, at least one of the two combinations including one of the at least one reference signal; and means for determining a present digital signal output state of the current time from the comparison.

52. A signal receiver as in claim 51 wherein each of the two combinations includes one of the at least one reference signal.

53. A signal receiver as in claim 51 wherein one of the two combinations is obtained from at least one differential amplifier.

54. A signal receiver as in claim 51 wherein one of the two combinations is obtained from an impedance network.

55. A signal receiver as in claim 54 wherein the impedance network comprises an adjustable resistor controlled according to the previous signal transmission state.

56. A signal receiver as in claim 55 wherein the previous signal transmission state and the plurality of prior digital signal output states control the adjustable resistor.

57. A signal receiver as in claim 56 wherein the adjustable resistor comprises a plurality of resistors connected together through a plurality of gates.

58. A signal receiver as in claim 51 further comprising:

means for adjusting an adjustable resistor according to the plurality of prior digital signal output states to control an impedance of the signal receiver.

59. A signal receiver as in claim 51 wherein the at least one received input signal comprises a pair of differential signals.

60. A signal receiver as in claim 59 wherein the speed of the differential signals is above 500 MHz.

61. A signal receiver as in claim 59 wherein the at least one received input signal further comprises a signal from a neighboring signal line.

62. A signal receiver as in claim 61 wherein the signal from the neighboring signal line is combined into at least one of the two combinations to reduce effect of crosstalk from the neighboring signal line.

63. A signal receiver as in claim 62 wherein at least one adjustable resistor is used to combine the signal from the neighboring signal line into the at least one of the two combinations.

64. A signal receiver as in claim 63 further comprising:

means for adjusting the at least one adjustable resistor to optimize the reduction of crosstalk effect from the neighboring signal line.

65. A signal receiver as in claim 51 wherein the two combinations are determined from the previous signal transmission state and the plurality of prior digital signal output states.

66. A signal receiver as in claim 51 wherein said means for determining the comparison comprises:

means for selecting the comparison from a plurality of comparisons according to the previous signal transmission state and the plurality of prior digital signal output states.

67. A signal receiver as in claim 66 wherein the two combinations are predetermined.

68. A signal receiver as in claim 67 wherein the two combinations are substantially linear.

69. A signal receiver as in claim 51 wherein the previous signal transmission state is determined from the plurality of prior digital signal output states and a signal transmission state prior to the previous signal transmission state.

70. A bus signal receiver with reduced crosstalk effect, the bus signal receiver comprising:

means for generating a first combined signal, the first combined signal comprising a first differential input signal of a current time and a signal from a neighboring signal line;

means for generating a second combined signal, the second combined signal comprising a second differential input signal of the current time;

means for comparing, in the bus signal receiver, the first and second combined signals of the current time to determine a present digital signal output state at the current time, wherein the first and second combined signals are compared based on a prior digital signal output state that is determined at the time prior to the current time; and determining a previous signal transmission state of differential signals based on the prior digital signal output state, wherein the signal transmission state indicates signal levels of the differential signals relative to each other to transmit a digital symbol.

71. A signal receiver as in claim 70 wherein the second combined signal comprises the signal from the neighboring signal line.

72. A signal receiver as in claim 70 wherein the second combined signal further comprises at least one predetermined reference signal.

73. A signal receiver as in claim 72 wherein the first combined signal further comprises at least one predetermined reference signal.

74. A signal receiver as in claim 70, wherein the previous signal transmission state of differential signals is determined from a plurality of prior digital signal output states; and wherein the first and second combined signals are compared according to the previous signal transmission state of the differential signals.

75. A bus signal receiver for determining a digital signal state in a differential signaling system, said receiver comprising:
- a first amplifier, the first amplifier comparing a first differential input signal received by the bus signal receiver at a current time to a second differential input signal received by the bus signal receiver at the current time;
- a memory device, the memory device storing a plurality of prior digital signal output states, wherein the plurality of prior digital signal output states is determined at the time prior to the current time, the plurality of prior digital signal output states to determine a transmission state of differential signals at the current time, wherein the transmission state of the differential signals indicates a signal level of the first differential input signal relative to the second differential input signal to transmit a digital symbol;
- a second amplifier, the second amplifier comparing said first differential input signal to one of a first reference voltage and a second reference voltage based on the transmission state of the differential signals;
- a third amplifier, the third amplifier comparing said second differential input signal to one of said first reference voltage and said second reference voltage; and
- a weighting logic unit coupled with the memory device and all of said amplifiers, the weighting logic determining a present digital signal output state at the current time from said plurality of prior digital signal output states determined at the time prior to the current time and from outputs from all of said amplifiers.

76. A signal receiver as in claim 75 wherein said weighting logic unit weights output of all of said amplifiers with weight signals generated according to a plurality of prior digital signal output states to determine the present digital signal output state.

77. A signal receiver as in claim 76 wherein at least one of said amplifiers is a differential amplifier.

78. A signal receiver as in claim 76 wherein at least one of said amplifiers is a substantially linear differential amplifier.

79. A signal receiver as in claim 75 further comprising:
- a selection logic unit coupled with the memory device and the second and third amplifiers, according to said prior digital signal output state the selection logic unit determining which one of said first reference voltage and said second reference voltage is compared to said first differential input signal.

80. A signal receiver as in claim 75 wherein the weighting logic unit determining a previous signal transmission state from a plurality of prior digital signal output states.

81. A signal receiver as in claim 80 wherein the weighting logic unit determines weights to outputs of all of said amplifiers according to the previous signal transmission state; and weights the outputs of all said amplifiers with said weights.

82. A bus signal receiver to determine a digital signal state in a differential signaling system, said receiver comprising:
- a memory device, the memory device storing at least one prior digital signal output state determined at a time prior to a current time;
- a logic unit coupled with the memory device, the logic unit determining information about a present signal transmission state of differential signals at the current time from the at least one prior digital signal output state, wherein the information about the signal transmission state of differential signals indicates signal levels of the differential signals relative to each other to transmit a digital symbol; and
- a plurality of amplifiers coupled with the logic unit, the plurality of amplifiers performing a plurality of comparisons using a first differential input signal of the current time, a second differential input signal of the current time and at least one reference signals based on the information about the present signal transmission state, the logic unit determining a present digital signal output state at the current time from the information about the present signal transmission state and outputs of the plurality of amplifiers.

83. A signal receiver as in claim 82 wherein the logic unit compares two digital signal output states for determining the information about the present signal transmission state.

84. A signal receiver as in claim 83 wherein the logic unit stores the information about the present signal transmission state; and wherein the information about the present signal transmission state is determined from the at least one prior digital signal output state and information about a prior signal transmission state.

85. A signal receiver as in claim 82 wherein the logic unit weights the outputs of the plurality of amplifiers using weights determined according to the information about the present signal transmission state to determine the present digital signal output state.

86. A signal receiver as in claim 85 wherein the at least one reference signal is predetermined.

87. A signal receiver as in claim 82 wherein the logic unit combines the outputs of the plurality of amplifiers into a plurality of intermediate results and selects one from the plurality of intermediate results as the present digital signal output state using the information about the present signal transmission state.

88. A signal receiver as in claim 87 wherein the output of the plurality of amplifiers are substantially linear with respect to differences between corresponding signals being compared.

89. A bus signal receiver to determine a digital signal state in a communication link, said receiver comprising:
- a memory device, the memory device storing at least one prior digital signal output state determined at a time prior to a current time;
- a logic unit coupled to the memory device, the logic unit determining a previous signal transmission state of differential signals from the at least one prior digital signal output state, wherein the signal transmission state of the differential signals indicates signal levels of the differential signals relative to each other to transmit a digital symbol; and
- a signal combining unit coupled with the logic unit, the signal combining unit generating two signals at the current time based on the previous signal transmission state of the differential signals, the two signals are two combinations of at least one received input signal of the current time and at least one reference signal, at least one of the two combinations including one of the at least one reference signal, the logic unit comparing the two combinations to determine a present digital signal output state at the current time.

90. A signal receiver as in claim 89 wherein each of the two combinations includes one of the at least one reference signal.

91. A signal receiver as in claim 89 wherein the signal combining unit comprises at least one differential amplifier to obtain one of the two combinations.

92. A signal receiver as in claim 89 wherein the signal combining unit comprises an impedance network to obtain one of the two combinations.

93. A signal receiver as in claim 92 wherein the impedance network comprises an adjustable resistor controlled according to the previous signal transmission state.

94. A signal receiver as in claim 93 wherein the previous signal transmission state and the plurality of prior digital signal output states control the adjustable resistor.

95. A signal receiver as in claim 94 wherein the adjustable resistor comprises a plurality of resistors connected together through a plurality of gates.

96. A signal receiver as in claim 89 further comprising:
an adjustable resistor coupled to the logic unit, the adjustable resistor being adjusted according to the plurality of prior digital signal output states to control an impedance of the signal receiver.

97. A signal receiver as in claim 89 wherein the at least one received input signal comprises a pair of differential signals.

98. A signal receiver as in claim 97 wherein the speed of the differential signals is above 500 MHz.

99. A signal receiver as in claim 97 wherein the at least one received input signal further comprises a signal from a neighboring signal line.

100. A signal receiver as in claim 99 wherein the signal combining unit combines the signal from the neighboring signal line into at least one of the two combinations to reduce effect of crosstalk from the neighboring signal line.

101. A signal receiver as in claim 100 wherein the signal combining unit comprises at least one adjustable resistor to combine the signal from the neighboring signal line into the at least one of the two combinations.

102. A signal receiver as in claim 101 wherein the logic unit adjusts the at least one adjustable resistor to optimize the reduction of crosstalk effect from the neighboring signal line.

103. A signal receiver as in claim 89 wherein the two combinations are determined from the previous signal transmission state and the at least one prior digital signal output state.

104. A signal receiver as in claim 89 wherein the signal combining unit selects the comparison from a plurality of comparisons according to the previous signal transmission state and the at least one prior digital signal output state.

105. A signal receiver as in claim 104 wherein the two combinations are predetermined.

106. A signal receiver as in claim 105 wherein the two combinations are substantially linear.

107. A signal receiver as in claim 89 wherein the previous signal transmission state is determined from the at least one prior digital signal output state and a signal transmission state prior to the previous signal transmission state.

108. A bus signal receiver with reduced crosstalk effect, the signal receiver comprising
a signal combining unit, the signal combining unit generating a first combined signal comprising a first differential input signal of a current time and a signal from a neighboring signal line, the signal combining unit generating a second combined signal comprising a second differential input signal of the current time; and
a comparator coupled to the signal combining unit, the comparator comparing the first and second combined signals to determine a present digital signal output state at the current time, wherein the first and second combined signals are compared based on a prior digital signal output state determined at a time prior to the current time; and
a logic unit coupled to the signal combining unit, the logic unit controlling the signal combining unit, the logic unit to determine a precious signal transmission state of differential signals based on the prior digital signal output state, wherein the signal transmission state indicates signal levels of the differential signals relative to each other to transmit a digital symbol.

109. A signal receiver as in claim 108 wherein the second combined signal comprises the signal from the neighboring signal line.

110. A signal receiver as in claim 108 wherein the second combined signal further comprises at least one predetermined reference signal.

111. A signal receiver as in claim 110 wherein the first combined signal further comprises at least one predetermined reference signal.

112. A signal receiver as in claim 111 wherein the logic unit is coupled to the comparator to select a result of the comparing of the first and second combined signals according to a plurality of prior digital signal output states.

113. A signal receiver as in claim 112 wherein the logic unit determines the previous signal transmission state of the differential signals from the plurality of prior digital signal output states; and, wherein the first and second combined signals are compared according to the previous signal transmission state.

* * * * *